United States Patent [19]
Malladi et al.

[11] Patent Number: 5,845,249
[45] Date of Patent: Dec. 1, 1998

[54] MICROARCHITECTURE OF AUDIO CORE FOR AN MPEG-2 AND AC-3 DECODER

[75] Inventors: Srinivasa R. Malladi, San Jose; Mahadev S. Kolluru, Santa Clara, both of Calif.

[73] Assignee: LSI Logic Corporation, Milpitas, Calif.

[21] Appl. No.: 642,520

[22] Filed: May 3, 1996

[51] Int. Cl.⁶ ............................................... G10L 9/00
[52] U.S. Cl. ...................................... 704/270; 704/778
[58] Field of Search ............................. 395/2.12, 2.2, 395/2.79, 2.84; 704/203, 211, 270, 275, 278

[56] References Cited

U.S. PATENT DOCUMENTS

| | | | |
|---|---|---|---|
| 5,126,726 | 6/1992 | Howard et al. | 340/728 |
| 5,394,473 | 2/1995 | Davidson | 381/36 |
| 5,448,310 | 9/1995 | Kopet et al. | 348/699 |
| 5,473,631 | 12/1995 | Moses | 395/2.12 |
| 5,506,832 | 4/1996 | Arshi et al. | 370/13 |
| 5,515,107 | 5/1996 | Chiang et al. | 348/473 |
| 5,576,765 | 11/1996 | Cheney et al. | 348/407 |
| 5,576,958 | 11/1996 | Kawakatsu et al. | 364/725 |
| 5,594,789 | 1/1997 | Seazholtz et al. | 379/207 |
| 5,598,352 | 1/1997 | Rosenau et al. | 364/514 A |
| 5,623,311 | 4/1997 | Phillips et al. | 348/396 |
| 5,635,985 | 6/1997 | Boyce et al. | 348/402 |
| 5,638,128 | 6/1997 | Hoogenboom et al. | 348/416 |

OTHER PUBLICATIONS

Jones, et al., *Futurebus Interface from Off–the–Shelf Parts*, IEEE, pp. 38–41, Continue on pp. 84–93, Feb. 1991.

J. DeTar, "*LSI Logic adds to telecom–specific core library*", Electronic News, p. 25, Sep. 19, 1994.

F. Gardner, "*LSI eases PCI bus development*", Electronic News, p. 197, Aug. 1, 1994.

L. Gwennap, "*LSI delivers MPEG decoder for digital TV*", p. 20, Microprocessor Report, May 10, 1993.

C. Joly, et al., "*ASIC integration relies on reusable cores*", Electronic Engineering Times, p. 46, May 1, 1995.

Unknown, "*Coding of Moving Pictures and Associated Audio–for Digital Storage Media at up to About 1.5 Mbit/s*", Aug. 2, 1996, ISO, CD 11172–1 rev. 1.

Dave Bursky, "*Single Chip Performs Both Audio and Video Decoding*," Electronic Design, Apr. 3, 1995.

Unknown, "*Coding of Moving Pictures and Associated Audio for Digital Storage Media At Up To About 1.5 MBIT/s*," 3–11171 rev. 1, (Part 3 Audio), May 30, 1995.

Martin Boliek, "*Real–Time Discrete Cosine Transform Chip Using Generalized Chen Transform Techology*," pp. 428–431, Ricoh California Research Center, Menlo Park, CA.

(List continued on next page.)

*Primary Examiner*—David R. Hudspeth
*Assistant Examiner*—Susan Wieland
*Attorney, Agent, or Firm*—Hickman & Martine, LLP

[57] ABSTRACT

A reusable hardware layout ("core") for performing some, but not all, MPEG and AC-3 audio decoding functions. Specifically, the audio core performs matrixing and windowing operations of MPEG and AC-3 decoding. The disclosed audio core design includes a data path, a control logic unit, an input RAM interface (for controlling an input RAM), an output RAM interface (for controlling an output RAM), a ROM, a ROM addressing logic unit, and a registers interface. The input RAM and the output RAM are located outside of the audio core. The control logic unit specifies in which state of multiple states the audio core currently resides, with each of the multiple states specifying one function or group of functions of either the MPEG or AC-3 decoding process. The control logic unit includes an MPEG state machine for generating MPEG state and cycle count information and an AC-3 state machine for generating AC-3 state and cycle count information. This information is employed by the RAM and ROM addressing logic to specify appropriate addresses for reading and writing data.

31 Claims, 17 Drawing Sheets

OTHER PUBLICATIONS

Unknown, *Digital Audio Compression (AC–3),* " T3 review copy of draft ATSC audio standard, Aug. 12, 1994, Doc. T3/251.

Unknown, *"Information Technology—Generic Coding of Moving Pictures and Associated Audio Information: Video,"* ISO/IEC 13818–2, Draft International Standard, Nov. 9, 1994.

Unknown, *"Coding of Moving Pictures and Associated Audio,"* ISO/IEC 13818–3, International Standard, Nov. 11, 1994.

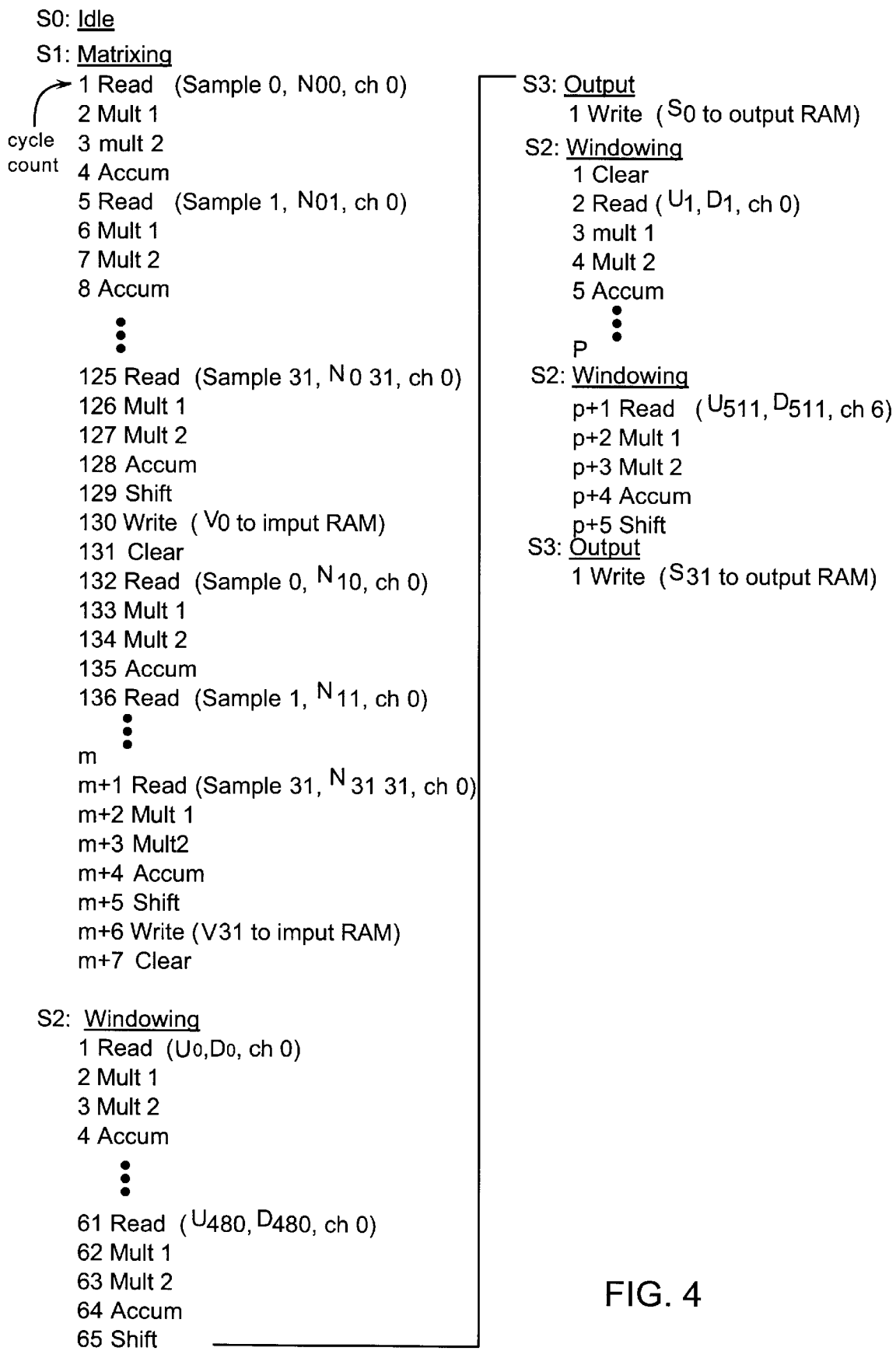

S0: <u>Idle</u>
S1: <u>Matrixing</u>
 1 Read (Sample 0, N00, ch 0)
 2 Mult 1
cycle 3 mult 2
count 4 Accum
 5 Read (Sample 1, N01, ch 0)
 6 Mult 1
 7 Mult 2
 8 Accum
 ⋮
 125 Read (Sample 31, $N_{0\ 31}$, ch 0)
 126 Mult 1
 127 Mult 2
 128 Accum
 129 Shift
 130 Write ($V_0$ to imput RAM)
 131 Clear
 132 Read (Sample 0, $N_{10}$, ch 0)
 133 Mult 1
 134 Mult 2
 135 Accum
 136 Read (Sample 1, $N_{11}$, ch 0)
 ⋮
 m
 m+1 Read (Sample 31, $N_{31\ 31}$, ch 0)
 m+2 Mult 1
 m+3 Mult2
 m+4 Accum
 m+5 Shift
 m+6 Write (V31 to imput RAM)
 m+7 Clear S2: <u>Windowing</u>
 1 Read ($U_0, D_0$, ch 0)
 2 Mult 1
 3 Mult 2
 4 Accum
 ⋮
 61 Read ($U_{480}, D_{480}$, ch 0)
 62 Mult 1
 63 Mult 2
 64 Accum
 65 Shift S3: <u>Output</u>
 1 Write ($S_0$ to output RAM)
S2: <u>Windowing</u>
 1 Clear
 2 Read ($U_1, D_1$, ch 0)
 3 mult 1
 4 Mult 2
 5 Accum
 ⋮
 P
S2: <u>Windowing</u>
 p+1 Read ($U_{511}, D_{511}$, ch 6)
 p+2 Mult 1
 p+3 Mult 2
 p+4 Accum
 p+5 Shift
S3: <u>Output</u>
 1 Write ($S_{31}$ to output RAM)

FIG. 4

MICROARCHITECTURE OF AUDIO CORE FOR AN MPEG-2 AND AC-3 DECODER

CROSS REFERENCE TO RELATED APPLICATIONS

This application is related to the following US patent applications: (1) U.S. patent application Ser. No. 08/643,185 filed on the same day as the instant application, and naming Srinivasa R. Malladi, Marc A. Miller, and Kwok K. Chau as inventors, and entitled "Method for Partitioning Hardware and Firmware Tasks in Digital Audio/Video Decoding," (2) U.S. patent application Ser. No. 08/642,396 filed on the same day as the instant application, and naming Srinivasa R. Malladi and Venkat Mattela as inventors, and entitled "Microarchitecture of Video Core for MPEG-2 Decoder," and (3) U.S. patent application Ser. No. 08/642,393 filed on the same day as the instant application, and naming Srinivasa R. Malladi as inventor, and entitled "Method and Apparatus for Designing Reuseable Core Interface Shells." All three applications are incorporated herein by reference in their entireties and for all purposes.

BACKGROUND OF THE INVENTION

The present invention relates to digital audio decoding. More specifically, the invention relates to hardware cores for decoding audio data encoded according to the MPEG-2 standard or AC-3 standard.

Various standards have been developed for the purpose of providing digitally encoded audio data that can be reconstructed to provide good quality audio playback. In the late 1980s, a digital audio/video reconstruction standard known as "MPEG" (for Motion Pictures Experts Group) was promulgated by the International Standards Organization (ISO). MPEG syntax provides an efficient way to represent audio and video sequences in the form of compact coded data. MPEG unambiguously defines the form of a compressed bit stream generated for digital audio/video data. Given the knowledge of the MPEG rules, one can thus create a decoder which reconstructs an audio/video sequence from the compressed bit stream.

MPEG-2 was initiated in the early 1990s to define a syntax for higher quality audio playback for broadcast video. The MPEG audio standard is described in a document entitled "Coding of Moving Pictures and Associated Audio for Digital Storage Media at up to about 1.5 MBits"(Part 3 Audio) 311171 rev 1 (1995) (hereinafter "the MPEG Document"). The MPEG-2 audio standard is described in a document entitled "Generic Coding of Moving Pictures and Associated Audio Information" ISO/IEC 13818-3 (1994) (hereinafter "the MPEG-2 Document"). Both standards documents are incorporated herein by reference for all purposes. Both documents are available from ISO/IEC Case Postale 56, CH-1211, Geneva 20, Switzerland.

A competing standard employing Dolby® processing and known as "AC-3" has also been developed by the United States Advanced Television Systems Committee for digital encoding and decoding of audio data. This standard is described in the "Digital Audio Compression (AC-3)" draft ATSC STANDARD" AC3STD68.DOC (1994) (hereinafter "the AC-3 Document") which is available from Dolby Laboratories, Inc. located in San Francisco, Calif. and is incorporated herein by reference for all purposes.

The MPEG-2 audio decoding algorithm requires certain steps such as decoding of bit allocation, decoding of scale factors, variable length decoding of audio samples, requantization of samples, inverse discrete cosine transform matrixing, and windowing. The AC-3 audio decoding algorithm requires certain steps such as bit allocation, dequantization, decoupling, rematrixing, dynamic range compression, inverse fast fourier transform, and windowing and de-interleaving.

While CPU digital processing power has improved markedly in recent years, the shear volume of encoded audio/video data that must be rapidly decompressed and played back generally requires some dedicated system hardware, beyond the CPU, for MPEG-2 decoding. CPUs like SPARC from Sun Microsystems, Inc. of Mountain View, Calif., MIPS from Silicon Graphics, Inc. of Mountain View, Calif., Pentium from Intel Corporation of Santa Clara, Calif., etc. can not, in themselves, handle MPEG-2 audio decoding simultaneously with video decoding. Thus, software/firmware implementation of the MPEG-2 decoding algorithms is not yet practical for mass market consumer applications, and dedicated hardware must be employed to perform at least some MPEG-2 decoding functions.

While the ISO/MPEG-2 and AC-3 standards do specify the form that encoded audio data must take, they do not specify either the exact sequence of steps or the hardware that must be employed in decoding the data. Thus, designers of MPEG-2 and AC-3 decoding systems are free to provide their own designs for particular applications. In fact, it is expected that each time an MPEG-2 or AC-3 decoder is to be designed for a new application, a designer will generate a new integrated circuit layout for the decoder.

Various MPEG-2 decoder chips are now available including the HDM8211M (from Hyundai Corporation of Seoul Korea) full MPEG-2 decoder of audio, video, and system (transport) bitstreams. See Bursky, "Single Chip Performs Both Audio and Video Decoding" Electronic Design, Apr. 3, 1995, pp. 77–80. This integrated circuit includes an MPEG-2 video decoder, an audio decoder, a system stream demultiplexer (this block separates the video and audio streams), a video display, a DRAM controller, and a 32-bit RISC processor (licensed from the SPARC Technology Business Group) which controls the internal workings of the MPEG-2 chip.

Designing new MPEG-2 decoder hardware such as the above described HDM8211M is, of course, a quite expensive process. The design is first provided as a Boolean description in a hardware design language such as Verilog. Then the code for the processor design model is used to create a net list, which is, in turn, used to create a physical layout for the integrated circuit. The physical layout is then converted to reticles (or masks) for fabricating the ultimate silicon version of the integrated circuit. At each stage in the process, from hardware design language description through silicon hardware, the integrated circuit must be extensively tested for bugs and to improve performance.

While this intensive procedure may be warranted in the case of a microprocessor or other chip which is likely to be sold in high volumes, it may not be justified in the case of integrated circuits having more limited applications, such as integrated circuits for some MPEG-2 and AC-3 decoders. Thus, it would be desirable to find a way to improve the ease with which new MPEG-2 decoder integrated circuits are designed and brought to market.

SUMMARY OF THE INVENTION

The present invention provides a reusable hardware layout ("core") for performing some, but not all, MPEG and AC-2 audio decoding functions. The functional blocks comprising this "audio core" define a unique hardware architecture which can be used with additional hardware or software for performing those MPEG and AC-3 audio decoding functions not performed by the audio core.

Hereinafter, except where distinctions between the two versions of the MPEG standard exist, the terms "MPEG" and "MPEG-2" will be used interchangeably to reference those audio decoding algorithms promulgated in the original MPEG Document as well as in the MPEG-2 Document, and any future versions of MPEG decoding. Likewise, the term "AC-3" is intended to refer to not only the current AC-3 standard, but any other versions of this standard that exist now or are developed in the future.

A chip designer may use the audio core of this invention to expedite the designing of an MPEG or AC-3 video decoder. However, because the audio core of this invention performs only some of the MPEG and AC-3 decoding steps, the designer is free to design blocks, optimized for the designer's purposes, to perform the remaining MPEG and/or AC-3 functions. The audio core of this invention is particularly useful for expeditiously designing "system" chips containing multiple cores on a single chip. Such cores might include, for example, the audio core of this invention, a video core, and a CPU core.

A significant benefit of an audio core derives from its availability for repeated use in many different chips for different applications. In each such chip, the audio decoding functions specified by the audio core can be employed without redesign. Thus, the audio core may be used on a first integrated circuit having a first integrated circuit design and on a second integrated circuit having a second integrated circuit design, with the first and second integrated circuit designs having at least some features not in common. If a system chip is employed, the first integrated circuit design may include a first collection of cores, while the second integrated circuit may include a second collection of cores, etc. — even though the first and second collections of cores have at least one core not in common.

The audio core design itself is preferably stored on a machine readable media such as a magnetic or optical storage unit. The information content of the core preferably includes a series of hardware layouts specifying the locations and features of various circuit elements comprising the audio core architecture. Ultimately, the audio core design is implemented as hardware on one or more chips. Thus, the audio core design exists as both an intangible description of hardware and as the actual hardware itself.

In a preferred embodiment, the audio decoder core design specifies that at least the following MPEG and AC-3 functions are performed by the hardware: sub-band synthesis (or "matrixing") and windowing. These functions are detailed in the MPEG Document and the AC-3 Document (as "Transformation Equations"). In especially preferred embodiments, other MPEG-2 and AC-3 functions such as bit allocation decoding, scale factor decoding, variable length decoding, requantization, decoupling, rematrixing, and dynamic range compression are not performed by the audio core of this invention.

In one aspect, the present invention provides an audio core design having a data path for performing some functions (usually matrixing and windowing) of both MPEG audio decoding and AC-3 audio decoding. From a structural perspective, the data path should include at least one multiplier and at least one accumulator. Other architecturally distinct logical blocks of the audio core may be a control logic unit, an input RAM interface (for controlling an input RAM), an output RAM interface (for controlling an output RAM), a ROM, a ROM addressing logic unit, and a registers interface. The input RAM and the output RAM are preferably located outside of the audio core.

Preferably, the control logic unit specifies in which state of multiple states the audio core currently resides, with each of the multiple states specifying one function or group of functions of either the MPEG or AC-3 decoding process. The control logic unit includes an MPEG state machine for generating MPEG state and cycle count information and an AC-3 state machine for generating AC-3 state and cycle count information. This information is employed by the RAM and ROM addressing logic to specify appropriate addresses for reading and writing data.

The input RAM interface controls reading of encoded audio samples from an input data partition of the input RAM and controls writing intermediate values generated during matrixing to one or more intermediate partitions of the input RAM. Preferably, the input data partition and the one or more intermediate partitions of the input RAM are provided in different locations for MPEG and AC-3 decoding algorithms. It may also control reading of intermediate values from the input RAM.

The ROM is used to store constants used in both the MPEG-2 and AC-3 audio decoding algorithms. These constants may include (i) matrixing constants for AC-3 and MPEG audio decoding algorithms and (ii) windowing coefficients for AC-3 and MPEG audio decoding algorithms. Preferably, the ROM includes a first partition for storing a first set of constants which are used as both IDCT coefficients for MPEG decoding and IFFT coefficients for AC-3 decoding. In particularly preferred embodiments, this first set of constants is reduced to only 34 unique constants (as opposed to 2048 constants specified for IDCT and 16,384 constants specified for IFFT), thereby minimizing the amount of storage space required in the ROM. The ROM may also include a second partition for storing a second set of constants which are used for pre-IFFT and post-IFFT steps of AC-3 decoding. Preferably, this second set of constants includes only 256 unique constants which are adequate for both the pre-and post-IFFT processing. Finally, the ROM may include a third partition for storing (i) 256 windowing coefficients for AC-3 decoding and (ii) 256 windowing coefficients for MPEG decoding.

BRIEF DESCRIPTION OF THE DRAWINGS

FIG. 4 is a diagram detailing the cycle-by-cycle behavior of the audio core in the various MPEG states.

DETAILED DESCRIPTION OF THE PREFERRED EMBODIMENTS

A. Application of Invention to Cores

Figure 1A:
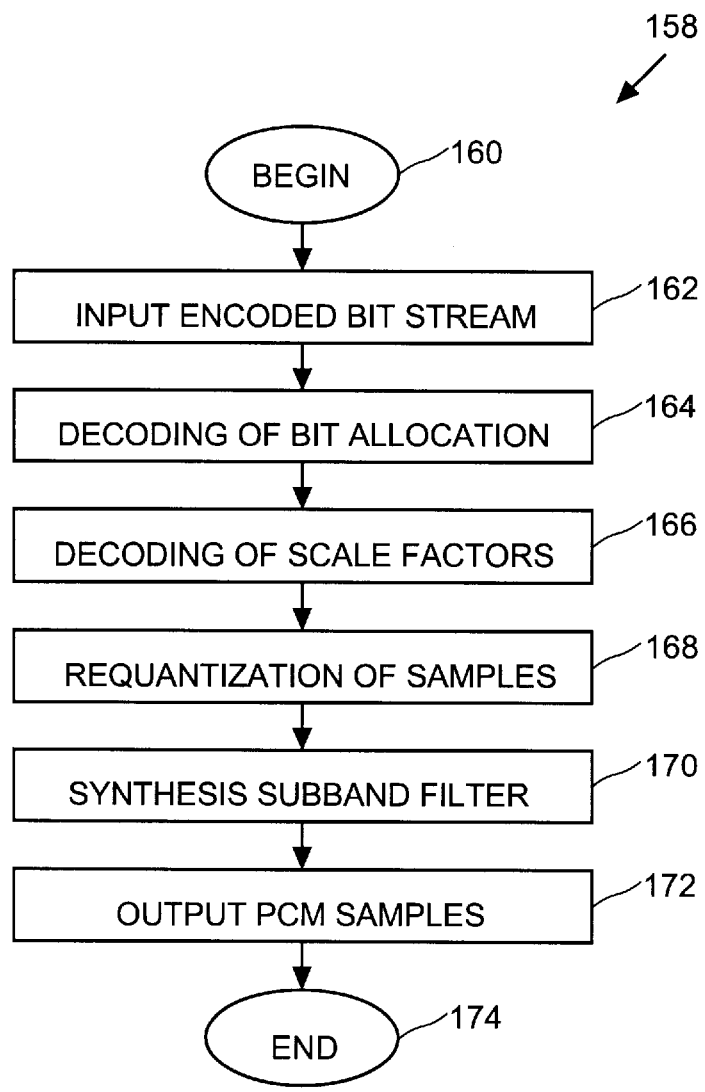
FIG. 1A is a process flow diagram illustrating the major steps required to decode MPEG audio data.

The present invention pertains to integrated circuit cores which implement at least some of the MPEG and/or AC-3 decoding requirements. As used herein, a "core" is the hardware layout of a substantially self-contained integrated circuit module such as a CPU, an Asynchronous Transfer Mode (ATM) unit, a memory unit, a network interface, a video decoder, and, the subject of this invention, an audio decoder. The physical core has associated therewith a core design which specifies a transistor-level layout including a collection of mask layouts used to generate the reticles for photolithography steps employed during integrated circuit fabrication. The core design also includes certain processing parameters associated with masks, such as ion implant energy and dose, etch conditions, oxidation conditions, chemical vapor deposition conditions, etc. Still further, the core design includes information specifying the core interface parameters such as the types of input and output signals required, the locations of the various interface connections, etc.

Some enterprises maintain libraries of cores, with each core of each library including the design information provided above. Such libraries provide competitive advantages to enterprises that make custom integrated circuits such as multi-core systems on a single semiconductor chip. Often such custom chips are not expected to sell in huge volume (at least as compared to CPU microprocessors for personal computers, for example). Thus, their design costs must be kept to a minimum. This can be accomplished by working with an enterprise that has an appropriate core design available for integration into the customer's chip design because the core need not be designed from scratch; the customer simply sets aside a "black box" of appropriate size and interface reserved for the core within its larger integrated circuit design.

As noted, core design libraries facilitate design of complex multi-functional "systems on a chip" including multiple cores integrated on single semiconductor chip. For instance, a single system on a chip might include a microprocessor core, a video decoder core, and an audio decoder core: all taken from the library of core designs. A system designer is left with the task of integrating the various cores on a single chip and providing any processing functionality not specified in the core designs.

The audio decoder core designs of the present invention possess the benefits of core designs generally as described above. Preferably, though not necessarily, the audio decoder core designs of this invention are provided as part of a larger library of core designs as described above.

While the present invention relates primarily to audio core designs and hardware, it also relates to methods of using the core designs in computer aided design of chip systems. Further, the invention relates to an apparatus for performing these operations. This apparatus may be specially constructed for the required purposes, or it may be a general purpose programmable machine selectively activated or reconfigured by a computer program stored in memory. The designs and methods presented herein are not inherently related to any particular computer or other apparatus. In particular, various general purpose machines may be used with programs written in accordance with the teachings herein, or it may be more convenient to construct a more specialized apparatus to perform the required method steps.

Still further, the present invention relates to machine readable media on which are stored (i) the audio core layout parameters and/or (ii) program instructions for using audio core in performing operations on a computer. Such media includes by way of example magnetic disks, magnetic tape, optically readable media such as CD ROMs, semiconductor memory such as PCMCIA cards, etc. In each case, the medium may take the form of a portable item such as a small disk, diskette, cassette, etc., or it may take the form of a relatively larger or immobile item such as a hard disk drive or RAM provided in a computer.

B. MPEG-2 and AC-3 Decoding Process

As the present invention preferably implements portions of the MPEG-2 and AC-3 audio decoding algorithms, these general decoding algorithms will now be briefly described with reference to FIGS. 1A and 1B. For purposes of the following discussion, it will be assumed that the reader has available a copy of the above identified MPEG and AC-3 Documents which were previously incorporated herein by reference.

The MPEG decoding process is detailed in FIGS. 1A. As shown there, a process 158 begins at 160 and then, in a step 162, the MPEG encoded bit stream is input to the audio decoder. Thereafter, at a step 164, the system decodes bit allocation parameters which specify the sample and scalefactor size for the data in each channel. Next, at a step 166, the system decodes "scalefactors" for use in a requantization step. Requantization of the actual encoded audio samples is performed next at a step 168.

MPEG audio data is provided as collections of discrete samples which are decoded in groups of 32. Further, the encoded MPEG audio data may include samples for 1, 2, 3, 4, 5, or 6 distinct channels. If only a single channel is provided, the audio data is replayed in monaural format. If two channels of encoded data are provided, the audio information is replayed in a stereo format. The other channels provide additional audio formats, with the sixth channel providing low frequency enhancement (i.e., the sixth channel provides sub-woofer data). Note that each channel being decoded will be coded in groups of 32 samples. Thus, if the audio format is monaural, only 32 samples will be decoded per MPEG decoding cycle. However, if a stereo format is employed, the decoder will decode 64 samples per decoding cycle.

The examples and discussion presented hereinafter will be directed to the MPEG-1 standard and MPEG-2 Layer I standard in which 32 samples per channel are decoded. However, it should be understood that the invention applies equally to the MPEG-2 Layer II standard in which 32*3=96 samples per channel are decoded.

Returning again to FIG. 1A, the process steps conducted through step 168 are performed outside of the audio core of this invention. Beginning with a step 170, processing is performed within the audio core. At step 170, subband synthesis of the samples is performed. Thereafter, at a step 172, the resulting Pulse Code Modulation (PCM) samples are output from the audio core. Thereafter the process is concluded 174.

The process flow 158 is reproduced from 3-A.1 (Annex) A of the MPEG document. It should be noted that MPEG audio decoding can be performed according to two formats in accordance with this invention: layer I and layer II. The above described procedure was made with respect to layer I. Layer II decoding is much like layer I decoding, except that the number of samples being processed in each audio decoding cycle is 96 rather than merely 32. Layers I and II are described generally at pages 39 through 42 of the MPEG document.

Figure 1B:
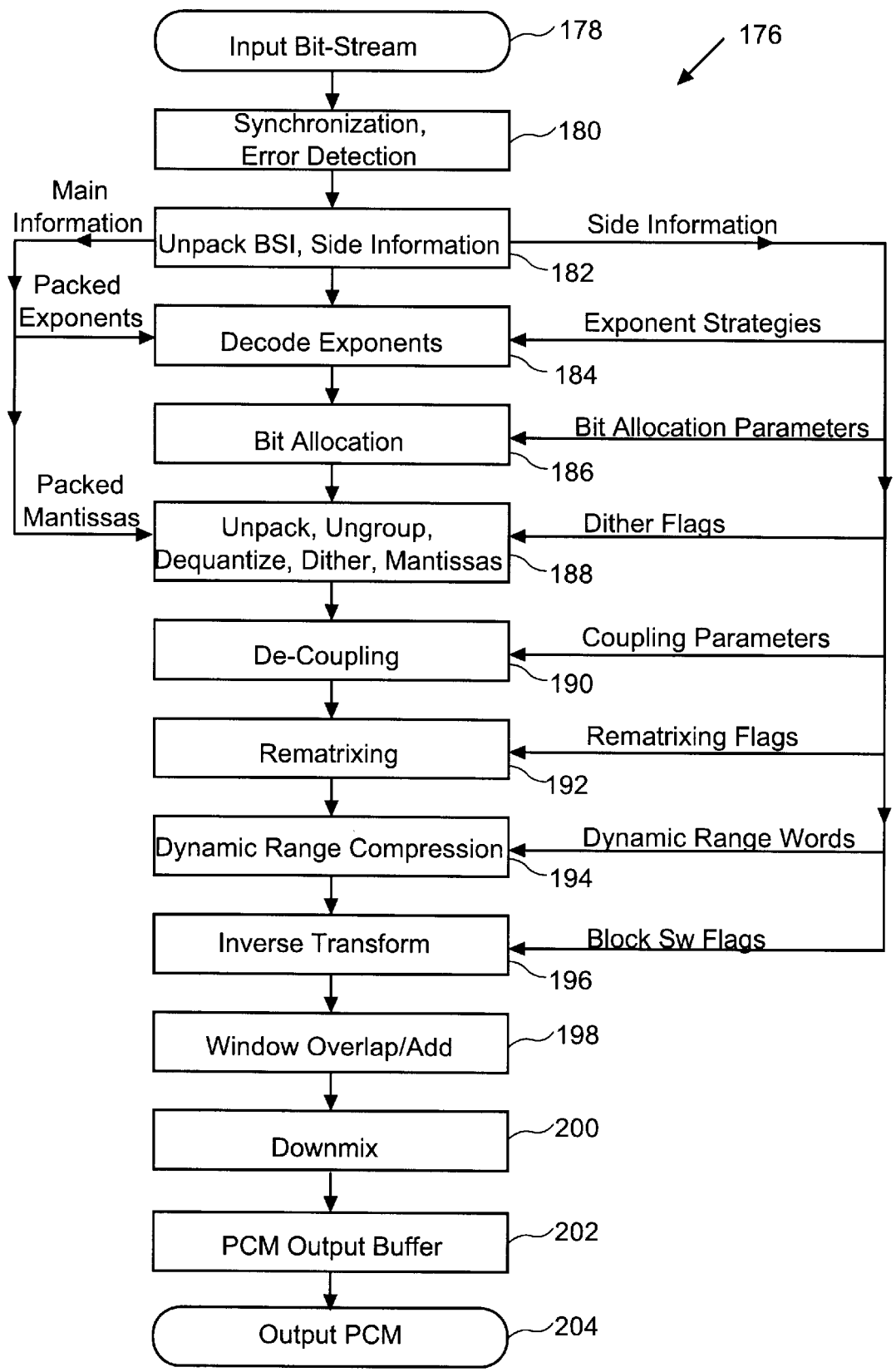
FIG. 1B is a process flow diagram illustrating the major steps required to decode AC-3 audio data.

Turning now to the process for AC-3 decoding, an AC-3 decoding process 176 is shown in FIG. 1B. This figure is reproduced from FIG. 6-1 (page 36) of the AC-3 document. The decoding process 176 begins at step 178 where the input bit stream is provided to the audio decoder. Next, at a step 180, the bit stream is synchronized and checked for errors. Thereafter, BSI and side information are unpacked at step 182. This information is employed in most of the remaining AC-3 decoding steps. Next, at step 184, the exponents for current group of samples are decoded. It should be noted that the sample data provided in the AC-3 format is in floating point format, as opposed to integer format (in the case of MPEG encoded data). Note also that the exponent strategies information (from the side information) and the actual packed exponents (from the BSI) are employed to decode the exponents at step 184.

Next, bit allocation parameters from the side information are used to allocate the bits within the bit stream at step 186. Thereafter, at a step 188, the mantissas are unpacked, ungrouped, dequantized, and dithered. Note that the actual packed mantissas are provided from BSI main information, and dither flags are provided from the side information. Following in from step 188 are a decoupling step 190, a rematrixing step 192, and a dynamic range compression step 194. Each of these steps employs the appropriate parameters or flags from the side information unpacked at step 182.

To this point, all steps in the AC-3 decoding process have been performed outside of the audio core. Beginning with a step 196, the processing is conducted within the audio core of this invention. Step 196, involves performing an inverse fast fourier transform of 256 AC-3 encoded samples. As will be explained in more detail below, this inverse fast fourier transform can be conducted in one of two modes: a 512-sample transform, and 256-sample transform. A block SW flag from the side information unpacked in step 182 specifies which of these two formats is to be employed on the incoming data. After the inverse transform step 196 has been completed, the process proceeds to a step 198 where windowing and overlap/add processing is performed. These steps will be described in more detail below.

At this point, the AC-3 processing within the audio core is complete, and further processing is again performed outside of the audio core. The first step outside of the audio core is a downmix step 200. Thereafter, the actual PCM values are provided to an output buffer at a step 202. Finally, the PCM values are output at a step 204.

The inverse fast fourier transform, windowing, and overlap/add steps of the AC-3 process are described at pages 73 through 77 of the AC-3 standard documents.

C. Audio Core Microarchitecture—High Level

Some approaches to implementing MPEG and AC-3 audio decoding have relied upon a general purpose CPU and software/firmware for performing all specified decoding steps. Unfortunately, this is not the most efficient way to handle the computationally intensive steps of the MPEG and AC-3 decoding algorithms. Further, to the extent that the CPU must be employed to perform the decoding steps, it is unavailable to perform other processing required by the system. Alternate previous approaches have relied entirely on custom hardware having a microcontroller which microsequences the control functions.

In contrast, the present invention segregates some computationally intensive MPEG and AC-3 decoding functions in dedicated hardware (the audio core), while allowing other less computationally intensive functions to be performed outside the core by a general purpose CPU for example. Thus, an IC designer is at liberty to develop specific processing capabilities for those MPEG and AC-3 decoder functions not in the audio core. Individual customers can employ the audio core of this invention and focus their design efforts on decoder functions such as run length decoding, and thereby develop a market niche on the basis of such specialization. In this invention, the audio core preferably performs the matrixing (inverse discrete cosine transform for MPEG and inverse fast fourier transform for AC-3 ) and windowing/overlap/add steps only.

Figure 2:
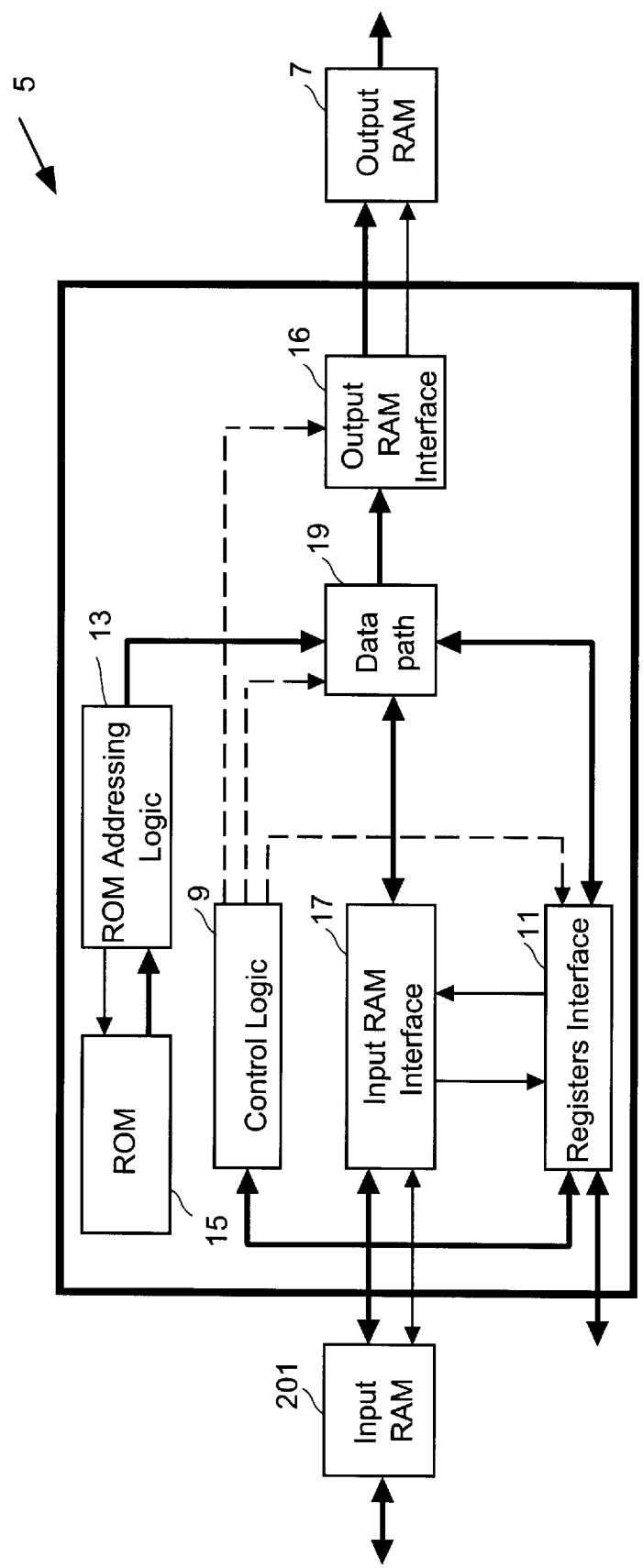
FIG. 2 is a block diagram illustrating the major hardware blocks of a audio core designed in accordance with this invention.

FIG. 2 is a block diagram of an audio core 5 constructed in accordance with a preferred embodiment of the present invention. In this figure, dashed lines indicate control signals, thin continuous lines indicate address signals, and thick continuous lines indicate data signals. While not forming part of the audio core per se, an input RAM 201 and an output RAM 7 are components of the overall audio decoding system which directly communicate with the logical blocks of audio core 5.

The control logic for the audio core 5 resides in a control logic block 9 which includes two state machines (not shown): one of which controls MPEG 2 processing and the other of which controls AC-3 processing. Control logic block 9 retrieves values from a register interface 11 which, in turn, receives data values from the encoded audio bit stream provided to portions of the audio decoder upstream from the audio core. Based upon the current values in the registers interface 11, the control logic block 9 provides control signals to a ROM addressing logic unit 13, an output RAM interface 16, an input RAM 17, and a data path 19. Among the signals provided by control logic block 9 are a "current state" indicative of the state of the overall MPEG 2 or AC-3 process, and a "cycle count" specifying the number of clock cycles that have passed since the system entered its current state.

Sub-band samples that have already been inverse quantized and otherwise processed prior to matrixing are loaded into input RAM 201. When a sufficient number of these samples have been loaded, a signal is provided to the register interface 11 indicating that the audio core may now retrieve the samples stored in input RAM 201. At that point, the samples are provided one-by-one to input RAM interface 17. More specifically, input RAM interface 17 provides address signals to input RAM 201. The samples associated with those address values are then forwarded, in the order specified by the address signals, as data to the input RAM interface 17. From input RAM interface 17, the samples are provided, in the order received, to data path 19. There they are multiplied with appropriate values from a ROM 15 and accumulated as necessary. Note that ROM addressing logic unit 13 generates the addresses for retrieving appropriate stored data values from ROM 15. Data path 19 performs the computational operations required for sub-band synthesis (matrixing) and windowing in accordance with the MPEG 2 and AC-3 standards. During these processes, intermediate values generated in data path 19 are temporarily written back to input RAM 201. As part of this process, input RAM interface 17 generates appropriate addresses for writing the intermediate values to input RAM 201. In subsequent processing, the intermediate values are retrieved from input RAM 201 by input RAM interface 17 and provided to data path 19 for further processing. After such further processing, the resulting values are forwarded to output RAM 7 where they are stored at addresses generated by output RAM interface 16.

In the hardware of the audio core, nearly all of the architecture is shared in MPEG and AC-3 decoding. The only major exceptions are the MPEG state machine and the AC-3 state machine.

D. Partitioning of the Input RAM

Figures 2A, 2B:
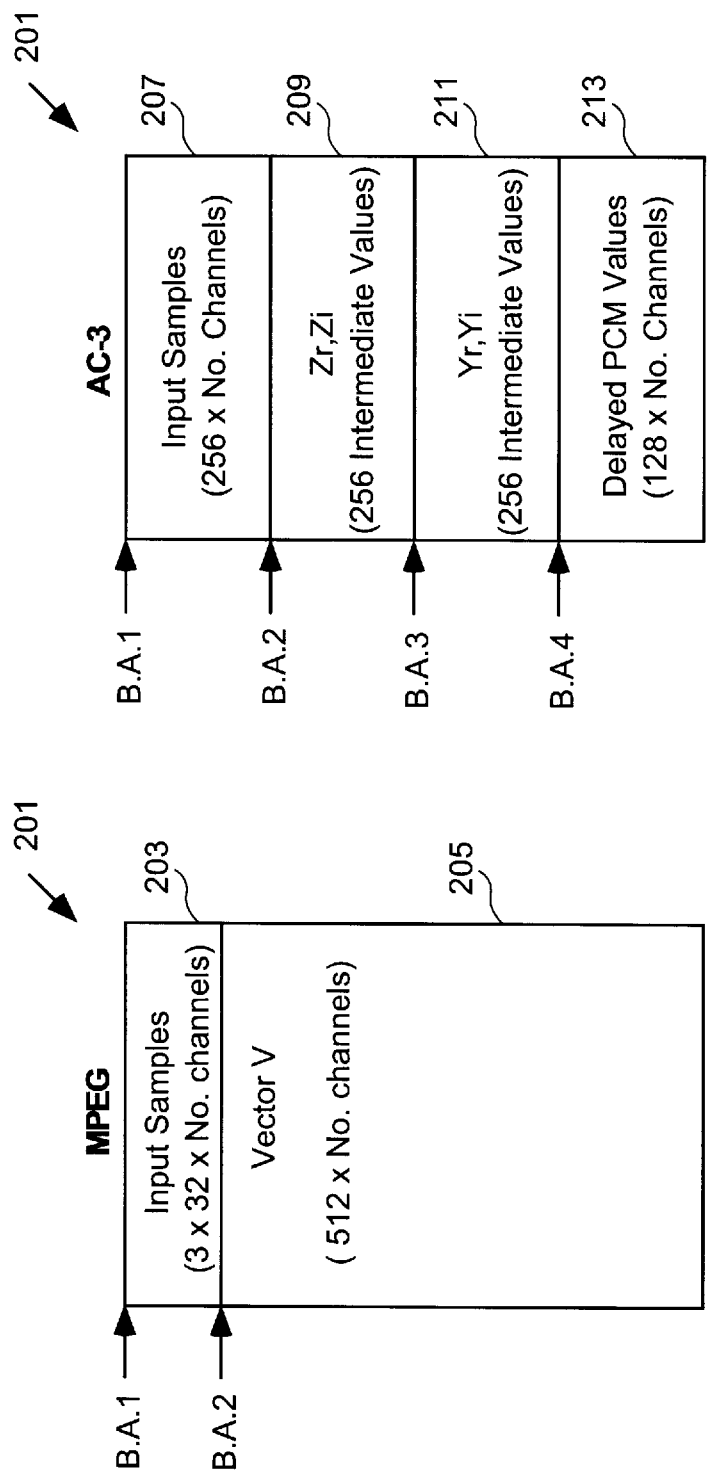
FIG. 2A is a block diagram illustrating the major audio core input RAM partitions employed for MPEG decoding.
FIG. 2B is a block diagram illustrating the major audio core input RAM partitions employed for AC-3 decoding.

FIGS. 2A and 2B show the partitioning of the input RAM contents. As shown, input RAM 201 will have different partitions depending upon whether the encoded data is MPEG data or AC-3 data. As shown in FIG. 2A, the MPEG partitioning provides two sections: a first section 203 in which input samples from the encoded data are stored prior to processing by the audio core and a "vector V" section 205 where intermediate values for a vector V calculated by the audio core itself are stored. The AC-3 partitioning shown in FIG. 2B includes four sections: an input sample section 207 which stores the incoming encoded data samples before they are presented to the audio core, a Zr, Zi, section 209, a yr, yi, section 211, and a delayed PCM values section 213. Each of the sections 209, 211, and 213 store intermediate values calculated by the audio core during processing of input samples originally stored in section 207.

As shown in FIG. 2A, input sample section 203 is large enough to store the data contained in 32 samples times the number of channels (a maximum of six) times 3 (for Layer II processing), for a maximum of 576 samples. Preferably, there are 24 bits per sample. Also shown in FIG. 2A, the vector V section 205 is sufficiently large to store 512 intermediate values (from vector V) per channel, for a maximum of 3072 intermediate values of 24 bits each. When the input RAM 201 is partitioned for AC-3 processing, as shown in FIG. 2B, the input samples are stored in partition 207 which is sized to store 256 times the number of channels. The Zr, Zi and yr, yi intermediate values are each stored in their own sections sized to contain 256 intermediate values of 24 bits each (sections 209 and 211). Finally, the delayed PCM values are stored in section 213 which is sized to store 128 values per channel.

E. MPEG Matrixing and Windowing

Figure 3:
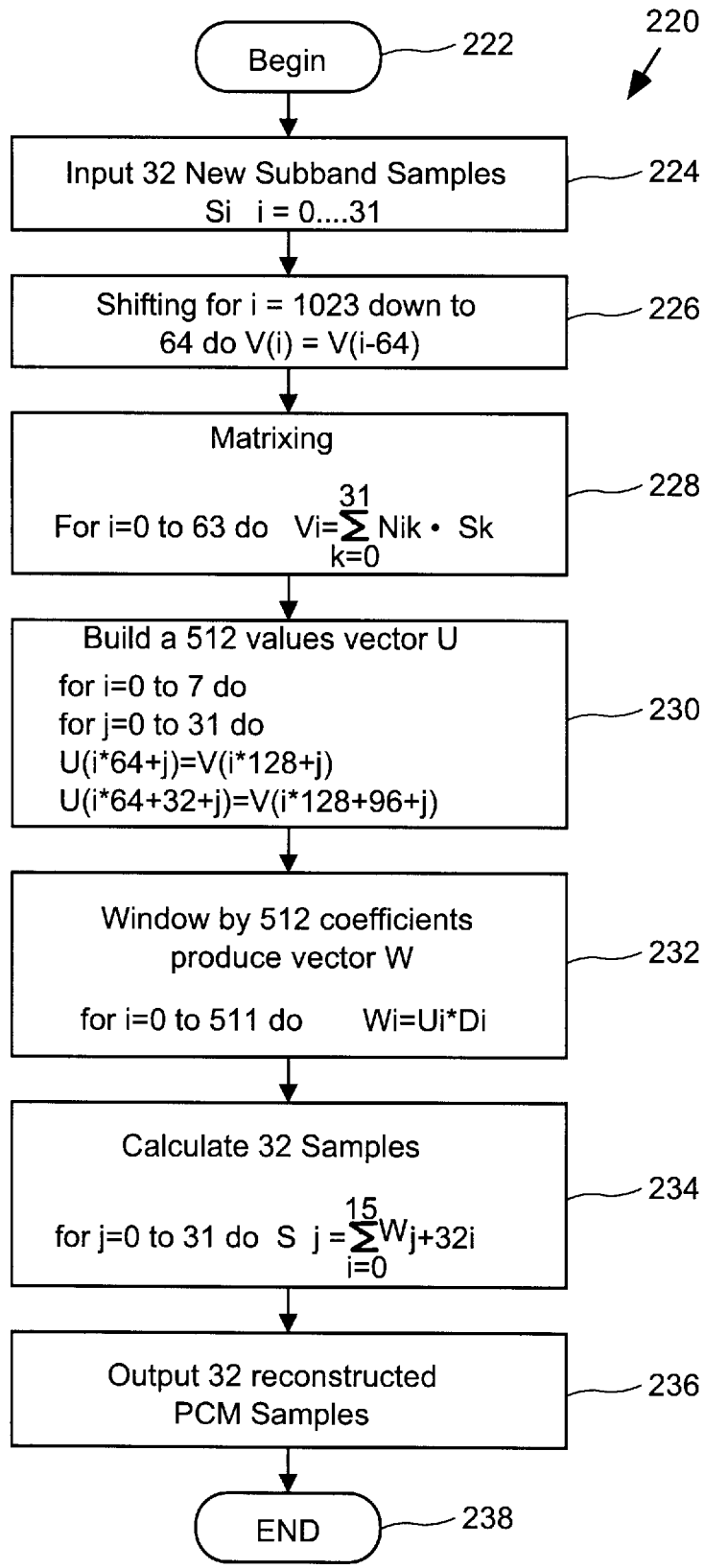
FIG. 3 is a process flow diagram of the principal MPEG Layer I and Layer II matrixing and windowing steps reproduced from the MPEG Document.

FIG. 3 is a flow chart reproduced from the MPEG Document. The process depicts the matrixing and windowing steps as required by the MPEG standard (corresponding to the step 170 of FIG. 1A). The process begins at 222 and proceeds to a step 224 where 32 new samples (per channel) are input. Thereafter, at step 226, the system implementing MPEG "shifts" the indices of elements constituting a vector V. Vector V is made up of 1024 previously stored values. As suggested by the MPEG standard, the shifting process involves freeing up 64 slots (V0–V64) by subtracting 64 from the indices of each of the 1024 existing values in vector V. In this manner, the vector values 960 through 1023 are shifted out of vector V.

Next, at a step 228, this system performs a matrixing operation (one dimensional inverse discrete cosine transform or IDCT) in which 64 new values are provided for vector V. These values are given indices $V_0$ through $V_{63}$ and are calculated according to the following expression:

$$V_i = \Sigma N_{ik} * S_k$$

(for k=0 to 31)
In this expression, the values of $S_k$ are the 32 samples which were inputted at step 224, and the values of $N_{ik}$ are constants given by the equation $N_{ik}=\cos[(16+i)(2k+1)/64]$.

Next, at a step 230, a vector U is created by reindexing the values of vector V according to the expressions shown in 230 of FIG. 3.

```
for i = 0 to 7 do
    for j = 0 to 31
        U(64i + j) = V(128i + j)
        U(64i + 32j) = V(128i + 96j)
```

Note that vector U will have only half the number of values as vector V (i.e., 512 values verses 1024 values).

The above described set of steps (steps 224, 226, 228, and 230) describe the matrixing operation performed by the audio core. After matrixing has completed at step 230, the windowing process begins at a step 232. As indicated at step 232 in FIG. 3, a vector W is produced by multiplying each value of vector U by a distinct coefficient, $D_i$. The values for $D_i$ are provided in Table 3-B.3 (page B-6 though B-8) of Annex B of the MPEG Document. After the vector W has been created, 32 samples (j=0 to 31) are calculated at a step 234 according to the expression shown in FIG. 3.

$$S_j = \Sigma W_{j+32i}$$

(for i=0 to 15)
In this expression, the individual sample values are noted by "Sj". As shown, each sample is constructed by summing 16 different values from vector W. Thus, each of the 32 samples employs 16 unique values from vector W, so that each value comprising vector W is used only one time in the construction of the 32 samples. After the samples have been constructed in step 234, a step 236 outputs the reconstructed PCM samples which are ready for playback. The process is completed at 238.

The present invention combines certain of the above mathematical operations required by the MPEG standard and then generates storage addresses for the resulting values according to an indexing scheme that condenses the above-described process to the following steps: (1) an input sub-band sample step, (2) a matrixing step, (3) a windowing step, and (4) an output reconstructed PCM samples step. Thus, in the flow chart of FIG. 3, steps 226, 228, and 230 are combined into a single matrixing step. Similarly, steps 232 and 234 are combined into a single windowing step. In this manner, the sub-band synthesis and windowing step can be performed faster and with fewer resources than is suggested by the MPEG document.

In a preferred embodiment, the audio core begins processing after it is informed that 32 new sub-band samples per channel (for a maximum of 192 sub-band samples of 24 bits each) have been loaded into the input RAM 201. At that point, the audio core begins sub-band synthesis of the 32 values stored for the first channel. This entails producing 32 new values for vector V according to the expression shown in step 228 of FIG. 3. The audio core then writes the 32 new values to addresses in the vector V partition of input RAM 201 at locations which overwrite old vector V values $V_{480}$ through $V_{512}$. In this manner, shifting step 226 (FIG. 3) is effectively performed. Further, the addresses employed by the audio core for storage of the vector V values are accessed as necessary according to the indices specified for the vector U as indicated in step 230 of FIG. 3. Thus, the audio core performs steps 226, 228, and 230 by simply calculating the 32 new values for vector V and applying an appropriate address to each of these values.

As noted, the audio core performs steps 232 and 234 of FIG. 3 in a single step. This is accomplished by performing the summation shown in step 234 while in the same step generating the values of vector W only as needed for the summation. For example, for j=0 and i=0, the value of vector W is obtained by multiplying the value $U_0$ by the windowing coefficient $D_0$. In this manner, the step of initially calculating all 512 values of vector W is postponed to streamline the data retrieval process.

A few points regarding the process of FIG. 3 are worth noting. First, for each 32 samples (per channel) loaded into input RAM 201, 32 values of vector V are generated. However, a total of 512 values are stored in the entire vector V. With each step of generating 32 new values of vector V the oldest 32 values in the entire vector V are shifted out. Thus, at any given time, the 16 most recent collections of 32 input samples (per channel) provide values currently stored in vector V. Second, while there are a total of 1024 values in vector V, according to the MPEG documents, some symmetry in the values of coefficient $N_{ik}$ require storage of only 512 values as vector V in the audio core implementation. That is, half of the values in original vector V are not stored in vector V of the audio core implementation. This is because each unique value in vector V has a corresponding value also within vector V that is opposite in sign. Thus, the information content in the 1024 values of vector V, as per the MPEG standard, is maintained in the 512 values of vector V of the audio core implementation.

F. RAM and ROM Address Generation in the Audio Core

Preferably, new addresses are generated by input RAM interface 17 from two parameters: a base address and an offset. A first level base address is provided for the beginning of each partition of input RAM 201. As shown in FIG. 2A, a base address B.A.1 is provided at the beginning of input samples partition 203 and a base address B.A.2 is provided at the beginning of vector V partition 205. As shown in FIG. 2B, a base address B.A.1 is provided at the beginning of input samples partition 207, a base address B.A.2 is provided at the beginning Of $Z_r$, $Z_i$ partition 209, a base address B.A.3 is provided at the beginning of $y_r$, $y_i$ partition 211, and a base address B.A.4 is provided at the beginning of delayed PCM values partition 213. For the MPEG an AC-3 input samples partition of input RAM 201, as well as for the MPEG vector V partition and the AC-3 delay values partition, a unique second level base address is provided for each channel of stored input sub-band samples. To retrieve an input sample in the case of MPEG decoding, the offset need be not greater than the value of 32 (the maximum number of stored sub-band samples). Therefore, the offset value can be represented by a 5 bit value. This reduces the processing resources required for address generation. Specifically, to generate an input RAM address at any given cycle, the input RAM interface 17 need have only a relatively small adder capable of adding a 10 bit value (the base address) to a 5 bit value (the offset address).

The proper base address and offset for each stage of the sub-band synthesis and windowing steps performed by the audio core may be uniquely specified as follows. The MPEG and AC-3 processes may be divided into a series of "states". For example, the MPEG process is divided into a matrixing state, a windowing state, and an output state. Within each state, a defined number of cycles is required to complete the operations required by that state. Further, the cycle count within each state unambiguously specifies what operation is being performed. Therefore, the audio core state and cycle count within that state uniquely specify addresses associated with input RAM 201, output RAM 7, and ROM 15. Those addresses are provided as a combination of a base address and an offset as mentioned above.

It should be understood that it requires a few cycles to generate each address. Specifically, various offset values must be multiplexed to generate a single offset value used to calculate the current address. Similarly, multiple base addresses must be multiplexed to generate a single base address used to generate the current address. Further, the offset must be added to the base address. Thus, the current addresses provided by the input RAM interface 17, the output RAM interface 16, and the ROM interface 13 are not generated instantaneously. As a result, the audio core must be designed to begin the address generating process an appropriate number of cycles before the address is actually used by the various interfaces.

G. Cycle-by-Cycle MPEG Decoding with the Audio Core

FIG. 4 details the cycle-by-cycle behavior of the audio core in the various MPEG states. Initially, at state S0, the audio core is idle. It remains in this state until a register indicates that all the necessary input sub-band samples have been loaded into the input RAM 201 (i.e., until 32 sub-band samples per channel for MPEG—and 3*32=96 for MPEG 2, Layer II—have been loaded pursuant to step 224 of FIG. 3). Thereafter, the audio core transitions to a state S1 (matrixing as indicated by steps 226, 228, and 230 in the MPEG flow shown in FIG. 3). There, initially at a cycle count of one, a read operation is performed. As shown, sample $S_0$ from channel ch0 is read from the input RAM 201, and coefficient $N_{00}$ is read from the ROM 15. These two values are then multiplied in an operation requiring two cycles as indicated by "mult1"(cycle 2) and "mult2" (cycle 3). Thereafter, at cycle 4, the product of the multiplication step is accumulated with the product of a previous multiplication step. As this is the first sample considered in the procedure, no previous multiplication steps have yet been performed. Therefore the current product is summed with zero.

Next, at a cycle 5, the value of sample $S_1$ is read from the input RAM 201 and the coefficient $N_{01}$ is read from the ROM 15, at cycles 6 and 7 these two values are multiplied, and at cycle 8 the product is accumulated with the previous value in the accumulator. In this manner, a read cycle two multiplication cycles and an accumulation cycle is repeated for each of samples 2–30. All the while, the value in the accumulator keeps growing. Then, at cycle 125, sample 31 (the final sample in channel 0) and coefficient $N_{031}$ are read into the audio core. These values are multiplied and accumulated to reach cycle 128. Thereafter, the value in the accumulator is shifted at cycle 129 to reduce it from a 48 bit value to a 24 bit value. The shifter performs this operation by truncating the 24 least significant bits from the accumulator value.

Next, at a cycle 130, the resulting value (which is equal to the first vector V value, $V_0$) is written to input RAM 201 intermediate partition 205. Then, at a cycle 131 the accumulator is cleared. The above process is then repeated at cycles 132 through M+7 to generate and store, as intermediate values, the remaining 31 new values for vector V.

Next, the audio core transitions to a state S2 where the windowing operation is performed. While in this state, the audio core performs the operations depicted in steps 232 and 234 of the MPEG process flow shown in FIG. 3. Initially, at a first cycle, a value $U_0$ is read into the audio core from partition 205 of input RAM 201. Concurrently therewith, a value $D_0$ is read from the ROM. It should be noted, that the vector value $U_0$ is read from the subpartition of the partition 205 containing the channel 0 vector values. Thereafter, in cycles 2 and 3, values $U_0$ and $D_0$ are multiplied. In cycle 4, the resulting product is accumulated. This process is continued in accordance with the summation expression shown in step 224 of FIG. 3. After 16 read and accumulation cycles have passed, a PCM sample 0 is generated at a cycle 64. That value is then shifted at cycle 65 to truncate the least significant 24 bits from a 48 bit value stored in the accumulator.

At this point, the audio core transitions to a state S3 where the resulting value (PCM sample 0) is written to the output RAM 7. This requires a single cycle as shown in FIG. 4.

Thereafter, the audio core transitions back to state S2, where the accumulator is cleared in a first cycle. Then, in the second cycle, the values $U_1$ and $D_1$ are read in. These values are subsequently multiplied and accumulated to reach cycle 5. The process is repeated 16 more times according to the expression in step 234 of FIG. 3. At this point, the accumulated value is shifted as described above and the audio core transitions again to state S3 where PCM sample 1 is output to the output RAM 7. This process of calculating a sample in state S2 and in transitioning to state S3 to write the resulting sample to the output RAM and then transitioning back to state S2 to do further calculations for the next sample is repeated until all 32 PCM samples are calculated for a single channel.

As additional channels are required, the audio core transitions back to state S1 where matrixing is performed as described. Then, after the 32 vector V values have been calculated written to the input RAM 201 (while in state S1), audio core 5 transitions to state S2 where windowing is performed. As each PCM sample is calculated during windowing, the audio core transitions for one cycle to state S3 where the sample is written to output RAM 7.

After the 32nd sample of the last channel has been written to output RAM 7, the audio core transitions to state 0 where it remains idle until notified that the input RAM is filled with the next 32 sub-band samples which are ready for matrixing and windowing as described above.

H. Audio Core Microarchitecture—The Control Logic Unit

Figure 5A:
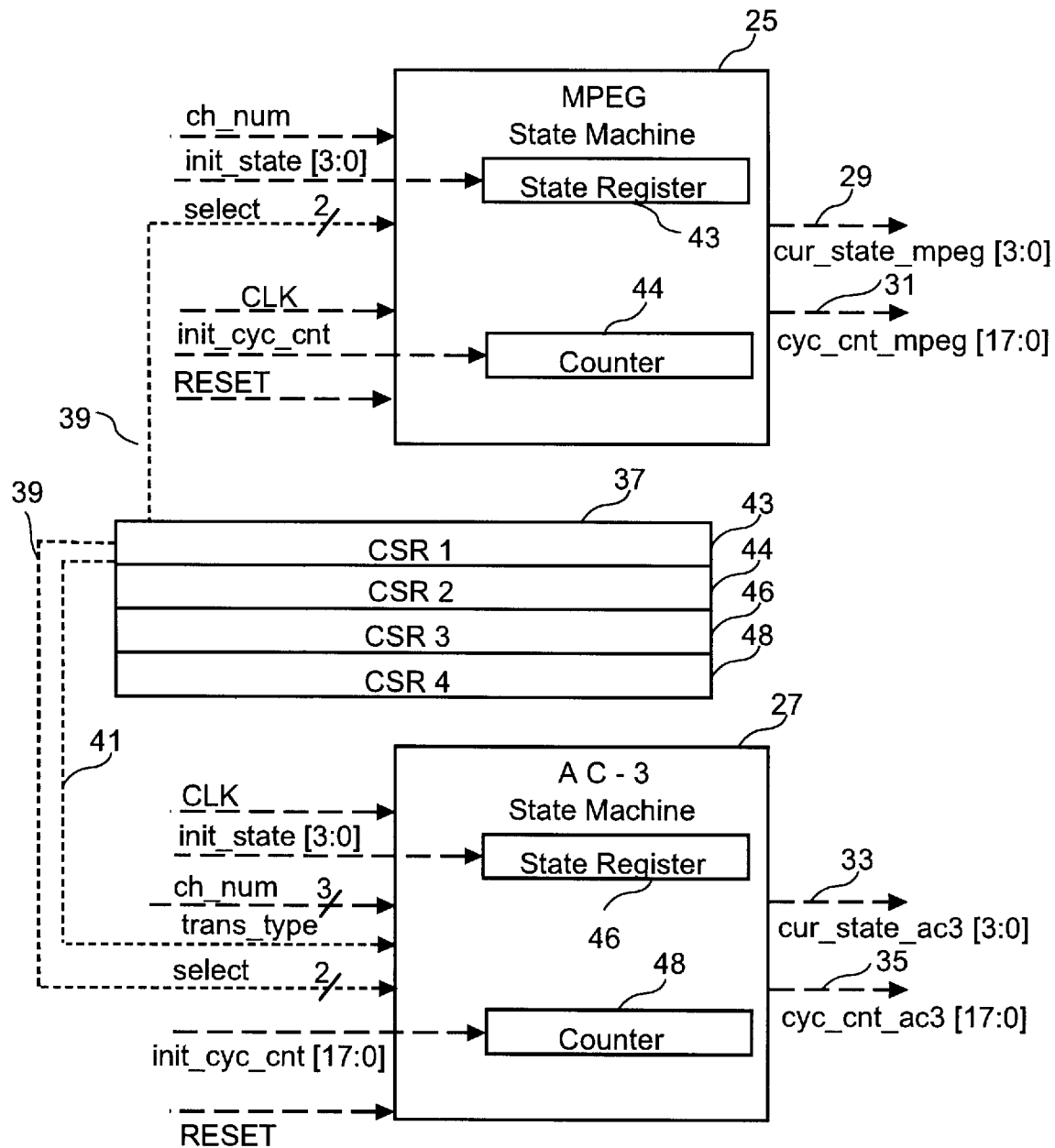
FIG. 5A is a diagram of an MPEG state machine and an AC-3 state machine employed with the audio core control logic in accordance with a preferred embodiment of the present invention.

Contained within control logic block 9 are two state machines shown in FIG. 5A. An MPEG state machine 25 generates a current state control signal 29 and a cycle count control signal 31. An AC-3 state machine 27 generates a current state control signal 33 and a cycle count control signal 35. Each state machine accepts control signals from a control and status register ("CSR") 37 which forms part of registers interface 11 as shown FIG. 2. The values stored in CSR 37 are written there by audio decoder components or firmware residing outside the audio core.

Control Status Register (CSR) 37 contains four sub-registers (43, 44, 46, and 48) described as follows. The first sub-register 43 includes a 2 bit "select" field which specifies whether MPEG or AC-3 processing is being conducted, a 1 bit field which specifies whether Layer I or Layer II MPEG is being implemented, six 1 bit fields for each of the six possible channels each of which specify whether the channel is set for 512-sample transforms or 256-sample transforms of AC-3 (to be explained in more detail below), and a 3 bit field specifying the total number of channels for which data is being received. In FIG. 5A, the information in the select field is provided by a signal 39 and the information in the AC-3 transform type field is provided by a signal 41.

The second sub-control register 44 is filled with values for a first base address pointing to the beginning of the input samples partition 203 of input RAM 201 and a second base address pointing to the top of partition 205 in input RAM 201. These base addresses may change for each new set of input samples provided to input RAM 201. The third control subregister 46 performs a similar function in that it provides four base addresses for implementing AC-3 processing. Specifically, a first base address points to the top of partition 207, a second base address points to the top of partition 209, a third base address points to the top of partition 211, and a fourth base address points to the top of partition 213.

When the audio core begins processing, it checks the first field of the first control register to determine whether it is processing MPEG or AC-3 data. If it is processing MPEG data, it looks to the second control register to identify the two base addresses stored therein. If, on the other hand, it is processing AC-3 data, it looks to the third control register to identify the four base addresses stored therein.

Finally, the fourth sub-control register 48 is a 1 bit register which is set to 1 only after all input samples have been loaded into input RAM 201. This instructs the audio core that it may now begin reading and processing those samples in accordance with the MPEG-2 or AC-3 standard.

In addition, the audio core includes a state register (not shown) which provides one 3 bit field to specify the current state of the audio core and another 18 bit field to specify the cycle count of the current state. These status registers are provided to allow audio decoder components outside of the audio core to determine the current state and cycle count of the audio core at any given time.

In addition to the information provided by CSR 37, other input values included to state machines 25 and 27 include a 4 bit initial state signal which specifies the idle state, a 3 bit channel number control signal specifying the current channel being processed, clock and reset signals from the system, and initial cycle count signal set to zero.

Figure 5B:
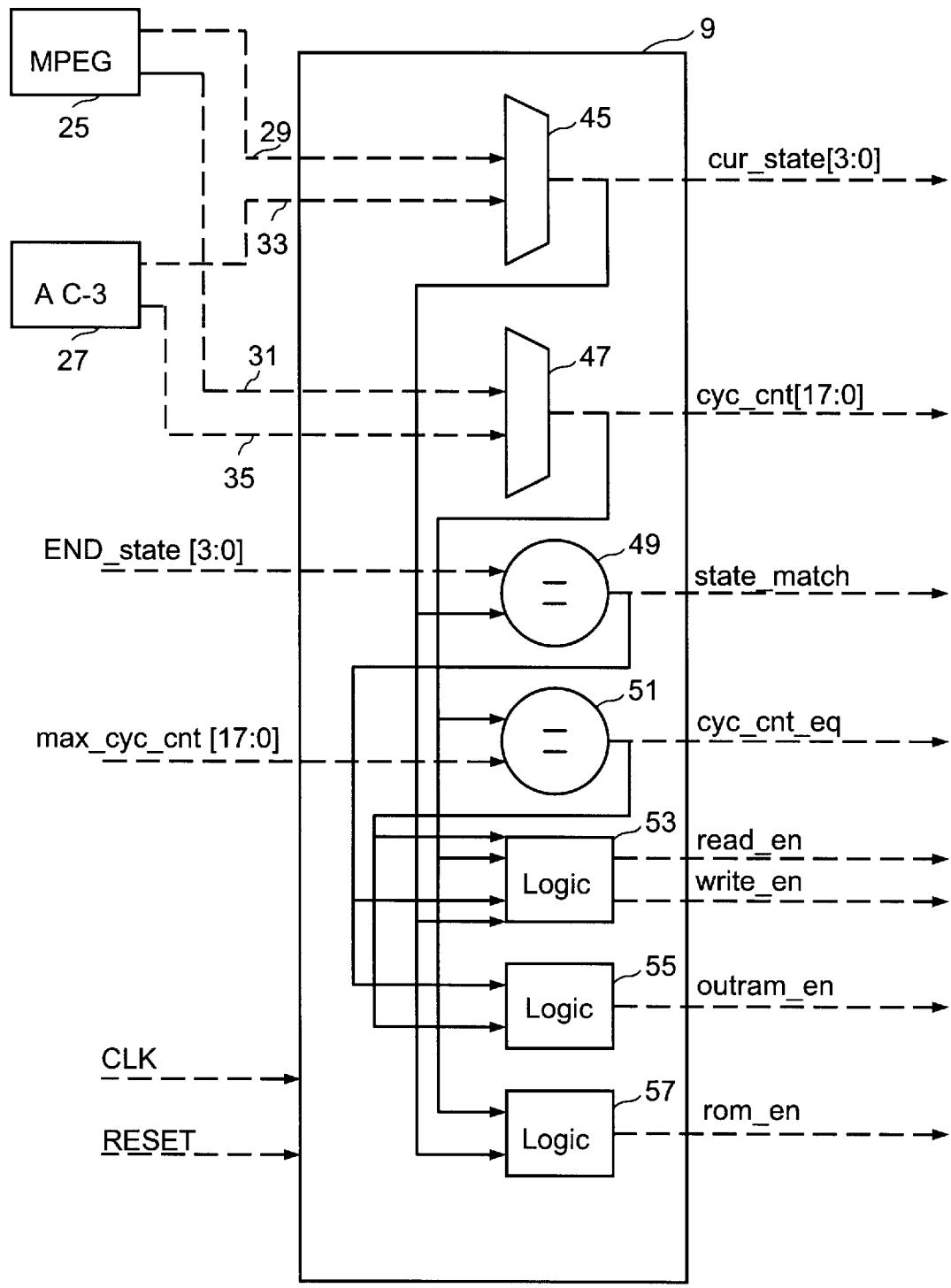
FIG. 5B is a block diagram of the audio core control logic unit in accordance with a preferred embodiment of the present invention.

FIG. 5B shows the entire control logic block 9 including MPEG state machine 25 and AC-3 state machine 27. As shown MPEG state machine 25 and AC-3 state machine 27 each provide state control signals to a multiplexer 45. Multiplexer 45 then selects only one of these state control signals to output from control logic block 9. The output current state signal unambiguously defines the current state of the audio core. In addition, the MPEG-2 state machine and AC-3 state machine each provide current cycle count control data to a multiplexer 47. Multiplexer 47 then selects one of these cycle count control signals to output depending upon whether AC-3 or MPEG-2 data is currently being decoded. In this manner, the other blocks within the audio core see only a single current state and a single current cycle count.

A logic block 53 provides enable signals to the input RAM interface 17. When a read enable signal generated from logic block 53 is set high, the input RAM interface 17 is instructed to read a value from the input RAM 201 (that value will be identified by an address currently stored with interface 17). Similarly, when a write enable signal generated by logic block 53 is set high, input RAM interface 17 is instructed to write information from the audio core into input RAM 201 at an address generated interface 17. Generation of a read enable or write enable signal by logic block 53 is controlled by the current state of the audio core. More specifically, it is controlled by the following four values: (1) a cycle count equal signal (which specifies whether the current cycle is the last cycle for a given state), (2) the cycle count signal output from multiplexer 47, (3) a state match signal (which indicates whether processing has been completed in a particular channel), and (4) the current state signal output from multiplexer 45.

A logic block 55 generates an output RAM enable signal in response to defined values of the state match signal and the cycle count equal signal. When the output RAM enable signal is active, data is written from output RAM interface 16 to output RAM 7 at location specified by addresses generated in output RAM interface 16.

A logic block 57 generates a ROM enable control signal in response to defined values of the current state signal and the cycle count control signal. The ROM enable signal is simply used to direct the ROM addressing logic 13 to retrieve a value from ROM 15 at an address specified within the ROM addressing logic 13.

As shown in FIG. 5B, the current state control signal is a 4 bit value. It has the value 0 for idle state, the value 1 for matrixing state of MPEG, the value 2 for the windowing state of MPEG, the value 3 for the output state of MPEG, the value 4 for the pre-IFFT state of AC-3, the value 5 for the IFFT and post-IFFT steps of AC-3, the value 6 for the windowing step of AC-3, and the value 7 for the output step of AC-3.

The state match control signal is a 1 bit signal output from a comparator 49 in control logic block 9. This control signal is set to 1 when the last state is being processed for a particular channel. For example, in MPEG-2 processing, when state S3, output, is reached for last sample value of any given channel, the state match value will be set to 1. This informs the audio core that when the cycle count is complete for the current state, the processing is terminated for the particular channel under consideration and the audio core should return to the initial state. The inputs to comparator 49 are an end state signal and the current state signal which is output from multiplexer 45. The end state signal simply identifies the last state of the MPEG or AC-3 decoding process.

The cycle count equal control signal is output from a comparator 51 which takes as inputs the current cycle count output from multiplexer 47 and a maximum cycle count signal specifying the maximum cycle count for the current state. This cycle count equal signal is set to 1 when the actual cycle count equals the maximum cycle count for the current state. Thus, the value of the cycle count equal control signal must be 1 at the same time that the state match control signal is 1 in order for the system to return to the initial state.

I. Audio Core Microarchitecture—The Input RAM Interface

Figure 6A:
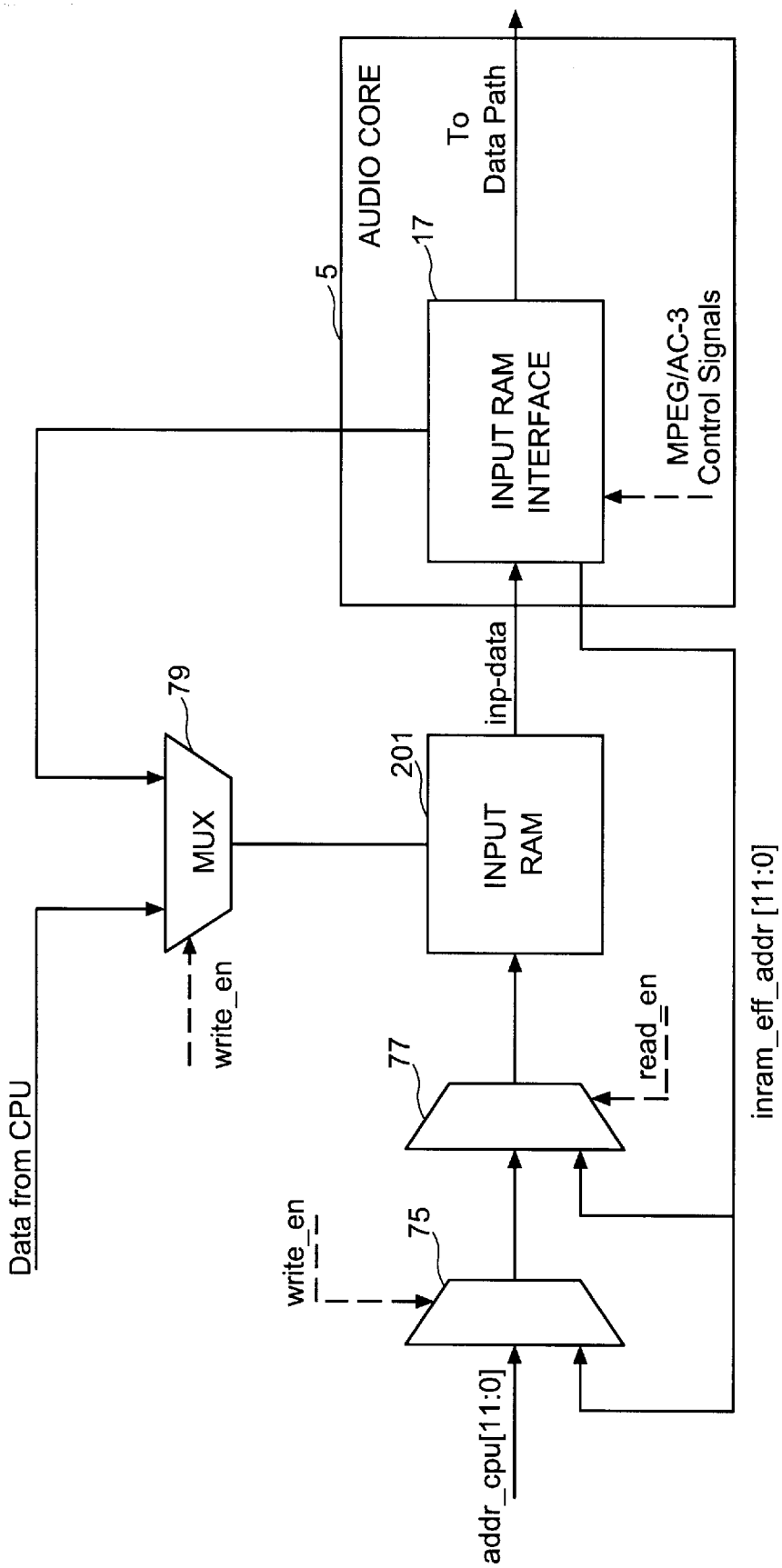
FIG. 6A is a block diagram of the input RAM 201 and relevant address and data hardware within and without the audio core.

FIG. 6A shows how input RAM interface 17 of the audio core 5 communicates with the input RAM 201 and associated control features lying outside of the audio core. These external features may be implemented as hardware or firmware under the control of a system CPU.

When an appropriate MPEG-2 or AC-3 control signal is received by input RAM interface 17 from control logic block 9, input RAM interface 17 will initially perform two functions. It will generate an address to a location within input RAM 201 and it will provide appropriate signals to the firmware outside of the audio core to specify how data and addresses to input RAM 201 are to be arbitrated.

Assuming that data from outside the audio core (e.g., sub-band samples in the incoming bit stream) are to be written to input RAM 201 (partition 203), the audio core will control the process as follows. First, in response to appropriate information from control logic block 9, audio core will provide an active write enable signal to a multiplexer 75. This directs multiplexer 75 to pass only the addresses generated by a system CPU. Those addresses will then also be passed by a multiplexer 77 so long as the read enable signal from audio core 5 is also active. The CPU generated address is then provided to input RAM 201 and data is written from a source outside the audio core. Specifically, data from an encoded bitstream passed through a multiplexer 79 to input RAM 201 at the address specified (in partition 203).

Now suppose that all 32 sub-band samples for each channel being decoded have been written from the input bit stream to the input samples partition 203 of input RAM 201. At that point, the samples may be serially read in to the audio core 5 by input RAM 17. To accomplish this, input RAM interface 17 generates an appropriate address in response to the current MPEG-2 or AC-3 control signals, and, in addition, provides an active read enable signal to multiplexer 77. The effective input RAM address signal generated by input RAM interface 17 is provided to multiplexers 75 and 77. Under these conditions, multiplexer 77 will receive two different addresses one specified by the input RAM interface and the other specified by the logic outside of the audio core. Because the read enable signal is active and the write enable signal is not active, multiplexer 77 will pass the address specified by input RAM interface 17. Thus, that address will be provided to input RAM 201 so that data can be read from it from the desired location.

Assume now that the audio core has performed some intermediate processing to generate intermediate values and these values must be written back to appropriate locations in input RAM 201. In the case of MPEG processing, these values have be written to partition 205. In the case of AC-3 processing, these value will be written back to partitions 209, 211, and/or 213. Again, input RAM 17 generates an address based upon the current values of certain control signals provided to it. In addition, the audio core provides an active write enable signal and a not active read enable signal to the multiplexers 75 and 79. Thus, the effective address generated from input RAM 17 is passed through multiplexer 75 and thereafter reaches input RAM 201. Further, the data from input RAM interface 17 passes through multiplexer 79 to be written input 201 at the location specified by the current effective address form input RAM interface 17.

Figure 6B:
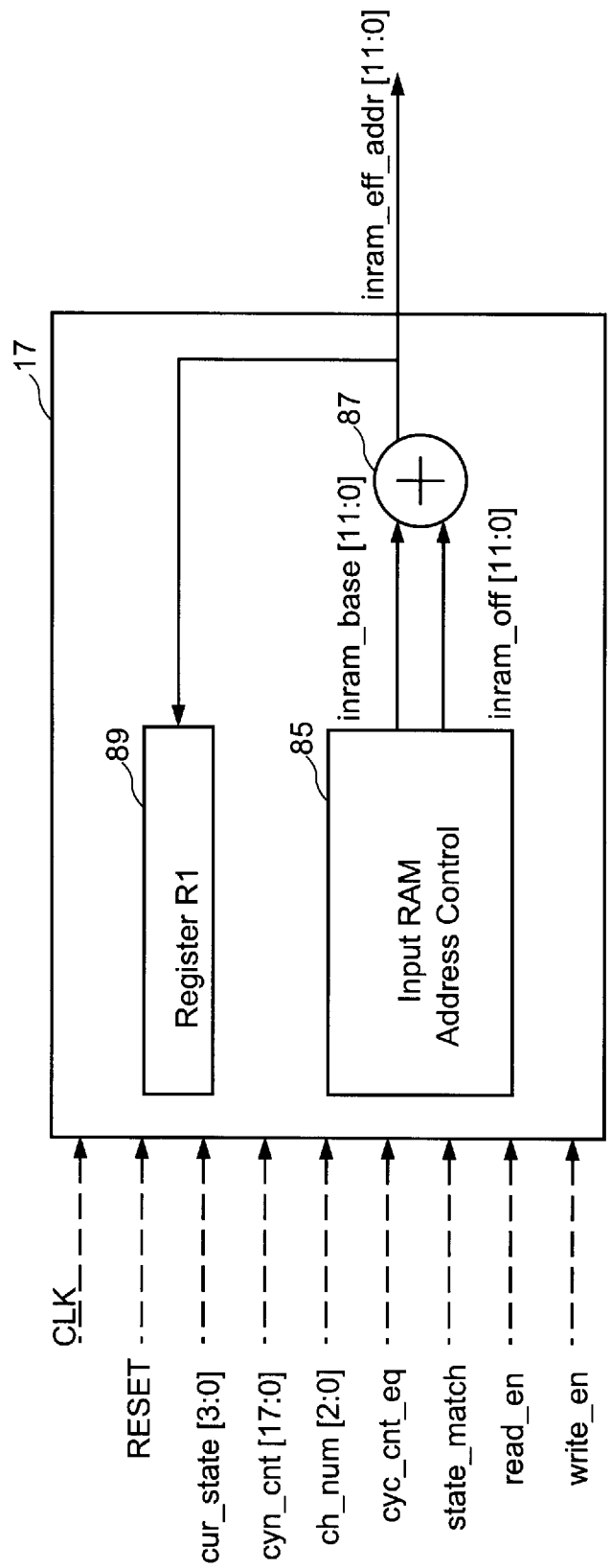
FIG. 6B is a block diagram of an audio core input RAM interface in accordance with a preferred embodiment of the present invention.

FIG. 6B details the architecture of input RAM interface 17. As shown, the signals provided to input RAM interface 17 include clock and reset signals, as well as the current state, cycle count, channel number, cycle count equal, state match, read enable, and write enable signals. These signals are used by an input RAM address control logic block 85 to generate two values: an input RAM base address and an input RAM offset. The 3 bit channel number input is provided to specify the base address within input RAM 201. Remember that a separate base address is provided for each channel of data stored in input 201.

Regarding the calculation of the base address. As noted, CSR subregisters 2 and 3 provide the initial base address for data being written into input RAM 201. Below these high level base addresses identifying the various partitions of input RAM 201, there are lower level base addresses separated from one another by constant distances. Each of these lower level base addresses correspond to the first address for a given channel. Thus, input RAM address control 85 can calculate the low level base address from the channel number input signal. An adder 87 adds the value of this low level base to the offset to generate an effective address which is provided to the input RAM 201.

The effective address is stored in a register 89 which may be read by other components of the audio decoder. Note that the value written into register 89 does not specify whether the corresponding location is to have data written to it or read from it. That depends upon the values 0 or 1 assigned to the read enable bit and the write enable bit.

Preferably, input RAM 201 is designed to have two ports. One port is a read/write port which is accessible to the audio core. The other port is a write only port accessible to the firmware portion of the audio decoder.

J. Audio Core Microarchitecture—The ROM and the ROM Interface

Figure 7A:
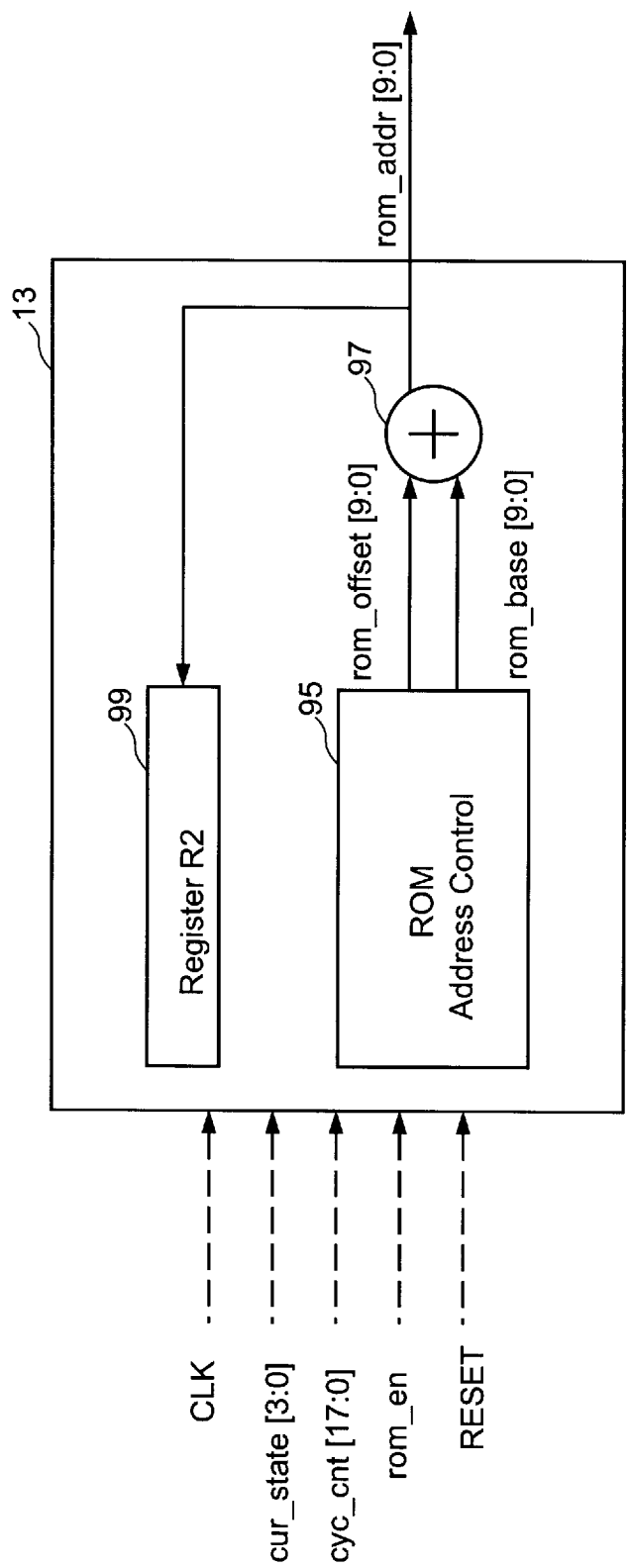
FIG. 7A is a block diagram of the ROM interfacing logic employed in an audio core of this invention.

FIG. 7A details the architecture of ROM addressing logic block 13. As shown, addressing logic block 13 receives as input signals a clock and a reset signal from the system, together with current state, cycle count, and ROM enable signals from the control logic unit 9. In response to the input signals, a ROM address control block 95 generates a ROM base address and a ROM offset. The ROM base address specifies a unique location for each ROM partition (discussed below). The ROM offset specifies an offset from these base addresses. An adder 97 adds the ROM base address to the ROM offset to generate a 10 bit ROM address provided to ROM 15. The ROM address is also written to a register 99 which may be read by various audio decoding elements. Further, the ROM enable control signal is provided to ROM 15.

Figure 7B:
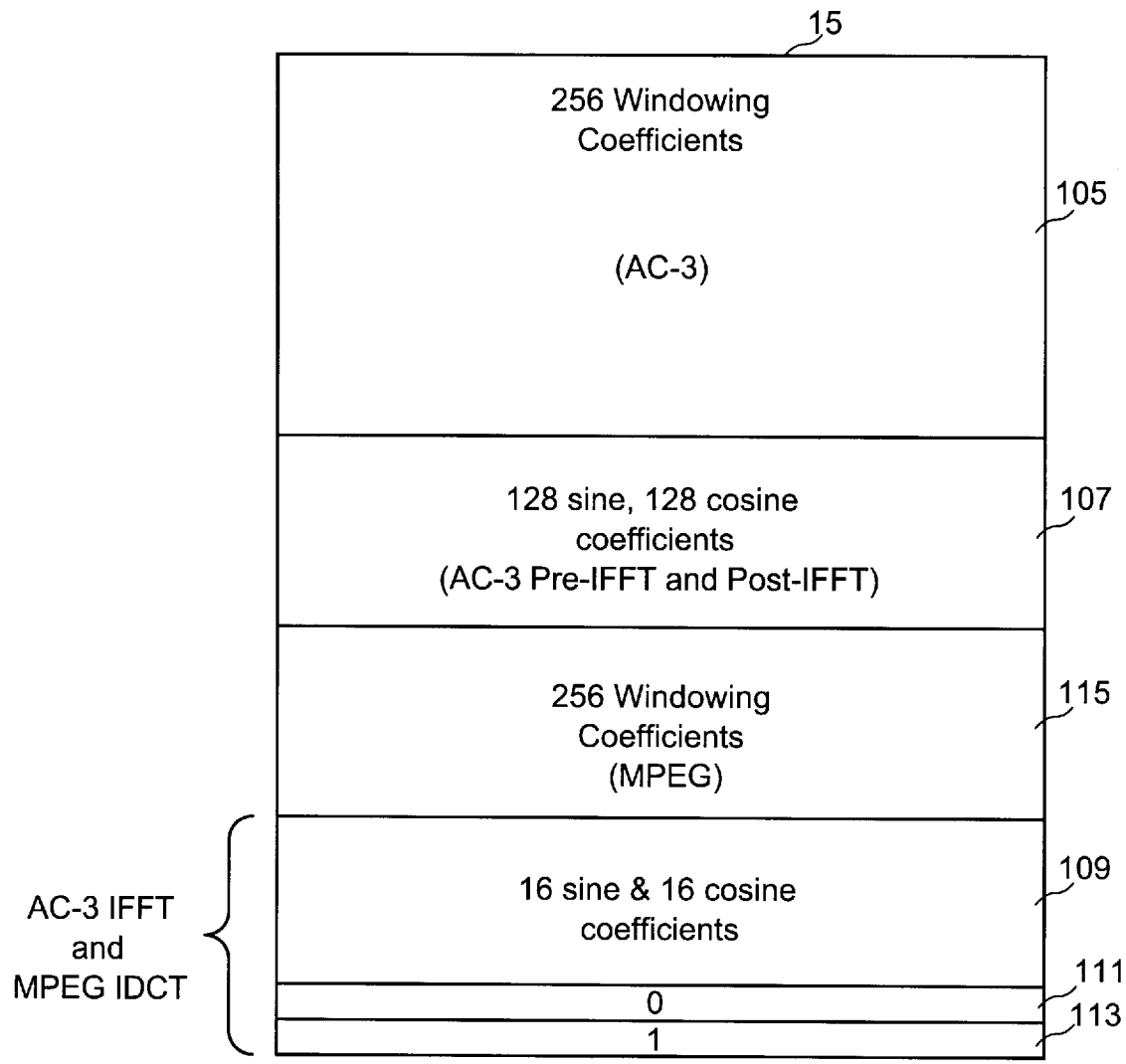
FIG. 7B is a block diagram of ROM partitioning in accordance with a preferred embodiment of the present invention.

FIG. 7B illustrates a preferred partitioning of ROM 15 in accordance with the present invention. As shown, a partition 105 provides 256 windowing coefficients to be employed in AC-3 decoding. A partition 107 provides 128 sine and cosine coefficients to be used in AC-3 pre- and post-IFFT processing. Next, the partition 115 contains 256 windowing coefficients required for MPEG windowing. Finally, partitions 109, 110, and 113 together provide coefficients for use in both the AC-3 IFFT step and the MPEG IDCT step. Partition 109 includes 16 sine coefficients and 16 cosine, partition 111 maintains the single value 0 (i.e., sin(0) or cos($\pi/2$)), and partition 113 contains the value 1 (i.e., cos(0) or sin($\pi/2$)).

This design very efficiently uses ROM storage space for the necessary MPEG and AC-3 matrixing and windowing coefficients. All coefficients necessary to perform MPEG sub-band synthesis are stored in partitions 109, 111, and 113 of ROM 15. The $N_{ik}$ values used in the matrixing step 228 of FIG. 3 are cosine values given by the following expression:

$$N_{ik}=\cos[\pi(16+i)*(2k+1)/64]$$

In this expression, i is a value between 0 and 63, and k is a value between 0 and 31. Thus, there are potentially 64 times 32 or 2048 different cosine coefficients available. However, in the present invention, these may be stored as 16 cosine values, 16 sine values, 0, and 1 (i.e., 34 distinct values). Many of the potential 2048 cosine values can be eliminated by recognizing that they duplicate one another. This can be understood by recognizing that cos(a)=cos(2n$\pi$+a), where n is any integer. Thus, every time the argument of the above cosine expression varies by a multiple of 2$\pi$, duplicate values are produced. As the cosine of 0, cosine of 2$\pi$, cosine of 4$\pi$, etc. all equal 1, the value of 1 is stored as a single coefficient. Also, because the cosine of $\pi/2$ as well as the cosine of 3$\pi/2$, etc. equals zero, the value zero is also stored as a separate coefficient.

Additional reductions in the number of coefficients can be obtained by employing certain trigonometric identities to reduce the number of coefficient values stored in ROM 15. By employing those identities, the relatively small number of coefficients stored in ROM 15 can be converted to the full complement of unique coefficients (before multiplication in data path 19). Specifically, the identities employed to reduce the coefficient to 16 cosine values and 16 sine values are the following:

cos ($\pi$ $-\theta$)=$-$cos $\theta$
cos ($\pi$ $-\theta$)=$-$cos $\theta$
cos (2$\pi$ $-\theta$)=+cos $\theta$
cos (2$\pi$ $-\theta$)=+cos $\theta$
cos ($\pi/2$ $-\theta$)=+sin $\theta$
cos ($\pi/2$ $-\theta$)=+sin $\theta$
cos (3$\pi/2$ $-\theta$)= $-$sin $\theta$
cos (3$\pi/2$+$\pi$ $-\theta$)= $-$sin $\theta$
cos ($-\theta$)=+cos $\theta$
cos ($-\theta$)=sin $\theta$
cos (0)=1
sin ($\pi/2$)=1
cos ($\pi/2$)=0
sin (0)=0
For Example: i=1, k=0 cos 17$\pi$/64=cos($\pi$/2$-$15$\pi$/64)=sin15$\pi$/64 (stored value)

Using the above expressions, the 16 cosine value and 16 sine values stored in ROM 15 are the following:

| | | |
|---|---|---|
| sin $\pi$/64 | sin 12$\pi$/64 | cos 6$\pi$/64 |
| sin 2$\pi$/64 | sin 13$\pi$/64 | cos 7$\pi$/64 |
| sin 3$\pi$/64 | sin 14$\pi$/64 | cos 8$\pi$/64 |
| sin 4$\pi$/64 | sin 15$\pi$/64 | cos 9$\pi$/64 |
| sin 5$\pi$/64 | sin 16$\pi$/64 | cos 10$\pi$/64 |
| sin 6$\pi$/64 | 1 | cos 11$\pi$/64 |
| sin 7$\pi$/64 | cos $\pi$/64 | cos 12$\pi$/64 |
| sin 8$\pi$/64 | cos 2$\pi$/64 | cos 13$\pi$/64 |
| sin 9$\pi$/64 | cos 3$\pi$/64 | cos 14$\pi$/64 |
| siu 10$\pi$/64 | cos 4$\pi$/64 | cos 15$\pi$/64 |
| sin 11$\pi$/64 | cos 5$\pi$/64 | cos 16$\pi$/64 |

When these coefficients are retrieved, it may of course be necessary to change their signs (or perform other simple arithmetic manipulations) before multiplication with the appropriate sample value. The appropriate logic in the data path 19 can perform this operation. This may be achieved in the ROM addressing logic for example.

The number of windowing coefficients required for MPEG may also be reduced to save storage space in partition 115 of ROM 15. Particularly, the MPEG standard requires 512 windowing coefficients ($D_i$). These coefficients are listed in Table-3-B.3 at pages B-6 through B-8 of the MPEG document. In a preferred embodiment of the present invention, however, only 256 of these windowing coefficients are stored. This may be accomplished by eliminating those windowing coefficients having negative values. It has been determined that half of the windowing coefficients listed in Table 3-B.3 of the MPEG document are simple negatives of the other values. In other words, there are only 256 distinct values within the standard table of windowing coefficients.

Regarding the AC-3 windowing coefficients stored in partition 105 of ROM 15, these are simply the values provided in Table 7–33 at page 77 of the AC-3 standard document. As the values provided in that table are each distinct, each of them must be stored in ROM 15.

Partition 107 of ROM 15 contains 128 sine coefficients and 128 cosine coefficients. These coefficients are used in the pre-IFFT and post-IFFT AC-3 processing steps. As will be explained in more detail below, AC-3 has two implementations: a 512-sample transform and a 256-sample transform. In each case, 128 unique sine coefficients and 128 unique cosine coefficients are required for the pre-IFFT step. The post-IFFT step requires exactly the same 128 sine coefficients and 128 cosine coefficients. Unfortunately, the coefficients employed in the 512-sample transform are different those employed in the 256-sample transform. However, it has been recognized that there is simple relationship between the 512-sample transform coefficients and the 256-sample transform coefficients. Specifically, the pre- and post-IFFT 512-sample transform coefficients represented by $\sin\theta$ or $\cos\theta$ have corresponding 256-sample transform coefficients represented by $\sin 2\theta$ or $\cos 2\theta$. In a preferred implementation, only the 512-sample transform coefficients are stored. When 256-sample transform coefficients are to be employed, the following trigonometric identities are employed:

$$\cos(2\theta)=2\cos^2\theta-1$$

$$\sin(2\theta)=2\sin\theta\cos\theta$$

While a few additional cycles may be required to calculate the 256-sample transform coefficients, the required storage space in ROM 15 is greatly reduced.

The AC-3 process also includes an IFFT step performed after the pre-IFFT step and before the post-IFFT step. As indicated in pages 74 and 75 of the AC-3 document, a total of as many as 1024 sine values and 1024 cosine values are employed in the 512-sample transform implementation and the 256-sample transform implementation. As with the pre- and post-IFFT coefficients, however, $\sin\theta$ and $\cos\theta$ values of the 512-sample transform correspond to $\sin 2\theta$ and $\cos 2\theta$ of the 256-sample transform. Thus, only the values for the 512-sample transform must be stored. Further, it has been recognized that many of the 1024 sine values and 1024 cosine values are redundant. Specifically, it been determined that the trigonometric relationships used to reduce the number of MPEG IDCT coefficients can also employed to reduce the AC-3 IFFT coefficients. In fact, it has been found that 16 sine coefficients and 16 cosine coefficients stored in partition 109 uniquely define all sine and cosine coefficients employed in the IFFT step of the 512-sample transform. Therefore, the amount of ROM space required to store MPEG IDCT coefficients and AC-3 IFFT coefficients is very greatly reduced. This greatly reduces the size of the audio core and allows very efficient accessing of the available values stored in ROM 15.

K. Audio Core Microarchitecture—The Output RAM Interface

Figure 8:
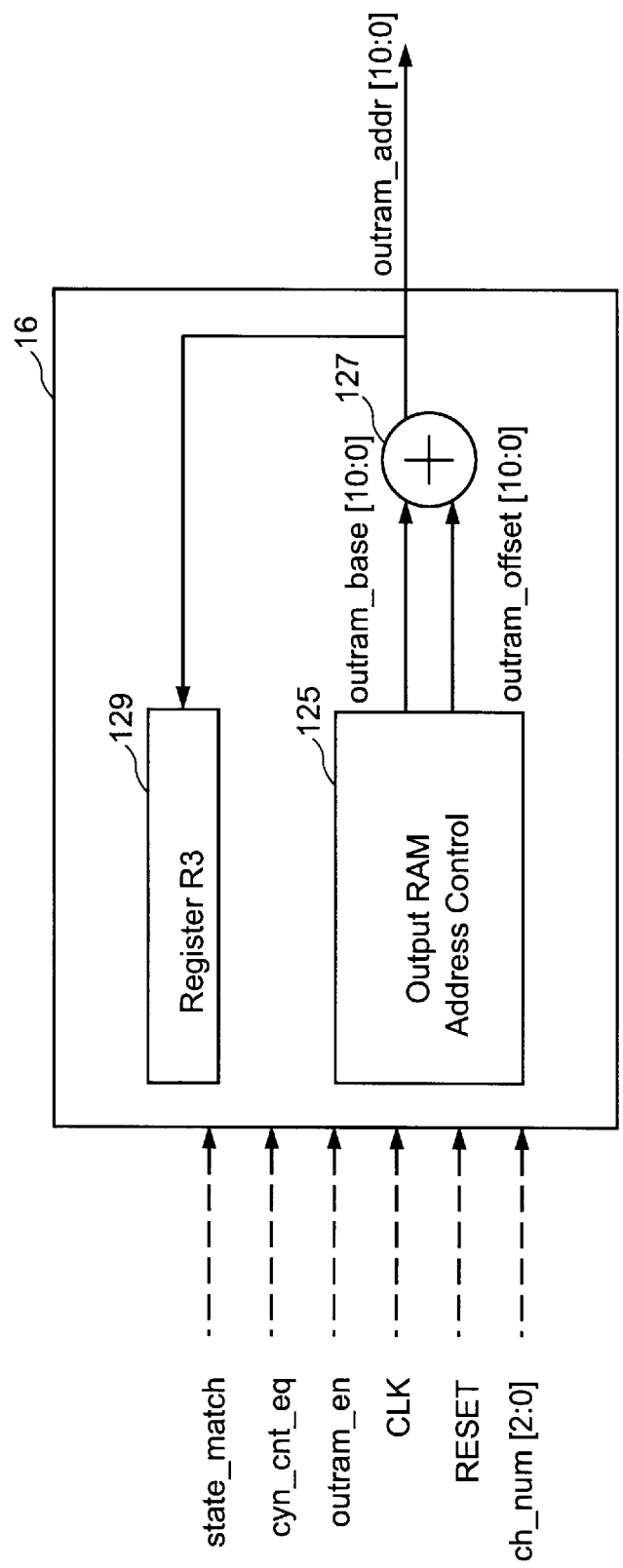
FIG. 8 is a block diagram of the output RAM interface unit employed in an audio core of this invention.

The architecture of output RAM interface 16 is detailed in FIG. 8. As shown, an output RAM enable control signal is provided to interface 16. When the value of this signal is set high, an output RAM address control block 125 will generate a current output RAM address. It will base this calculation upon the following other input signals: the state match signal, the cycle count equal signal, the clock signal, the reset signal, and the channel number signal from the first subregister of CSR 37. From this information, output RAM address control block 125 generates an 11 bit base address signal and an 11 bit offset signal. These values are then added by an adder 127 to generate the current output RAM address which is provided to output RAM 7. In addition, the output RAM address is written to a register 129 which is available to other components of the audio decoder.

Note that the output RAM, like the input RAM is segregated to by channel. As only output samples are being written to output RAM, no further segregation is required.

L. Audio Core Microarchitecture—The Data Path

Figure 9:
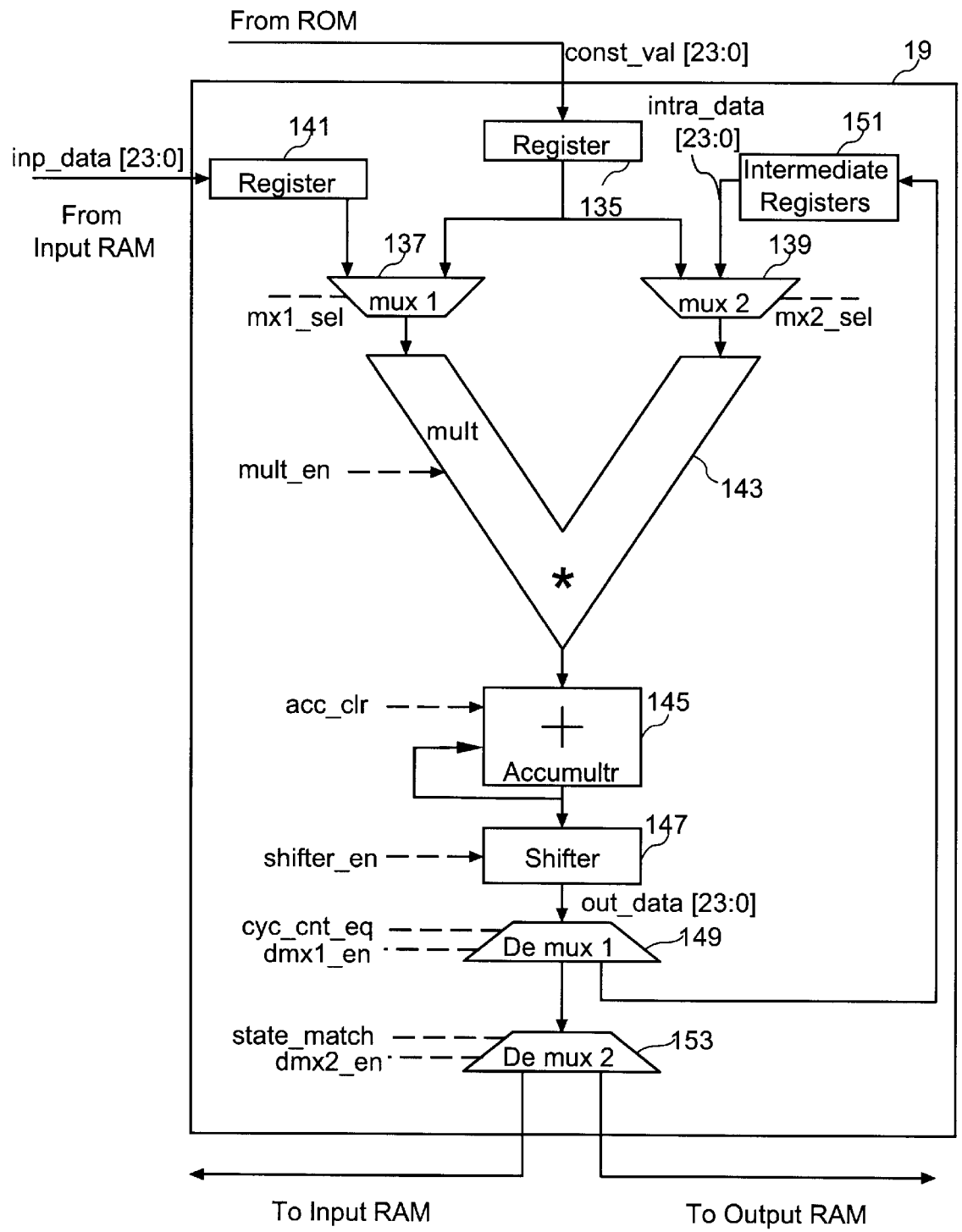
FIG. 9 is a block diagram of the data path employed in an audio core of this invention.

FIG. 9 details the architecture of data path 19. As shown, the data path operates on two inputs: one including coefficient data from ROM 15 and the other including data from input RAM 201. The coefficients from ROM 15 are temporarily stored in a register 135 from which they are provided to a first multiplexer 137 and a second multiplexer 139. The data from input RAM 201 is temporarily stored in a register 141, and, from there, provided to the multiplexer 137. In the case of MPEG implementation, the first multiplexer 137 will typically be set to provide sample or intermediate storage data from register 141, and the second multiplexer 139 will be set to pass coefficient data from register 135. Selection of input data to first multiplexer 137 will be controlled by a control signal mx1_sel, while second multiplexer 139 will be controlled by a control signal mx2_sel. Both of these signals are generated by control logic unit 9.

The matrixing portion of MPEG is accomplished by providing sub-hand samples through register 141 and IDCT coefficients through register 135. These values are then multiplied in a multiplier 143 controlled by a control signal designated mult_en from control logic unit 9. The output of multiplier 143 is provided to an accumulator 145 which accumulates successive outputs of multiplier 143 until summation over the requisite number of values has been performed for the operation at hand. For example, in the case of sub-band synthesis for MPEG-2, the accumulator will successively add 32 values before outputting a 48 bit value. When accumulator 145 does output a value, the 24 least significant bits of that value are truncated in shifter 147 to produce a 24 bit output value. The shifter 147 is enabled by a shifter enable signal provided from control logic unit 9. The accumulator 145 clears any residual value upon receipt of an accumulator clear signal from control logic unit 9.

The output of shifter 147 is then sent to a first demultiplexer 149 which is controlled by the cycle count equals signal and a dmx1 enable signal from control logic unit 9. Depending upon the value of these signals, first demultiplexer 149 may pass the shifter value to (1) a bank of intermediate registers 151 or (2) to a second demultiplexer 153. Depending upon whether it is enabled or not, the second demultiplexer 153 will provide the value to either input RAM 201 or output RAM 7. The second demultiplexer 153 is controlled by the state match signal and a dmx2 enable signal from control logic unit 9.

In the case of MPEG matrixing, the output of second demultiplexer 153 is provided to partition 205 of input RAM 201.

The intermediate registers 151 are reserved for (1) certain values generated during AC-3 processing which are not written back to input RAM 201 and (2) sine and cosine coefficient values from ROM 15 that must be multiplied to generate the appropriate coefficient value for matrixing (usually relying upon the identities $\cos 2\theta=2\cos^2\theta-1$ and $\sin 2\theta=2\sin\theta\cos\theta$). When intermediate registers 151 store a value which is to be multiplied by a constant stored in ROM 15, the second multiplexer 139 is set to pass the value in intermediate registers 151, while the first multiplexer 137 is set to pass the value stored in register 135.

In case of MPEG windowing, an intermediate value from vector U is provided from partition 205 of input RAM 201 to register 141 for multiplication with a windowing coefficient $D_i$ stored in register 135. These values are then passed through first and second multiplexers 137 and 139 to multiplier 143 where they are multiplied and provided to accumulator 145. Accumulator 145 accumulates 16 successive values as required by the windowing step in the MPEG standard. Thereafter the result is shifted by shifter 147 and process as described above. Ultimately, the reconstructed sample value is passed from second demultiplexer 153 to output RAM 7.

M. AC-3 Matrixing and Windowing

Figure 10:
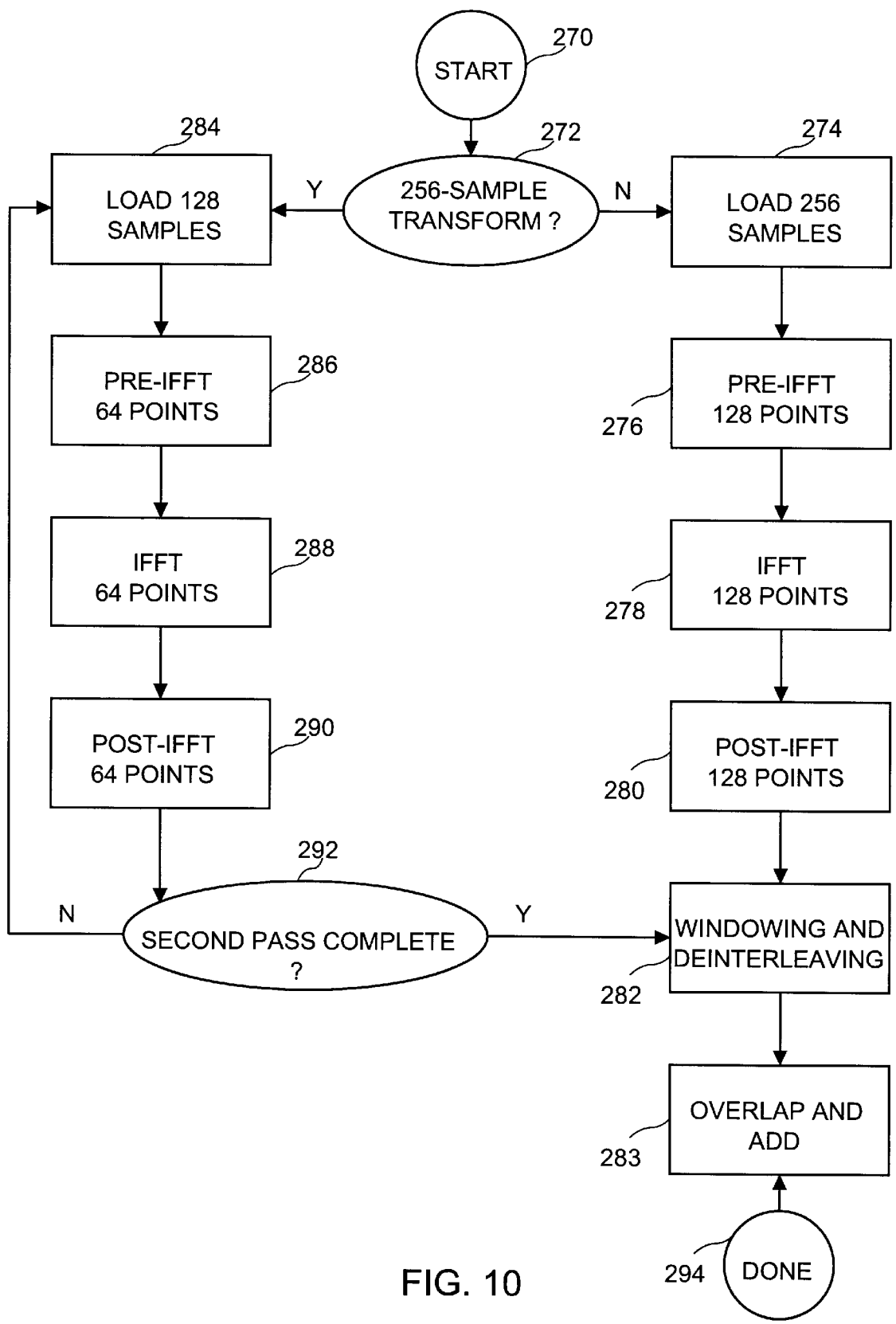
FIG. 10 is a process flow diagram of the principle AC-3 matrixing and windowing steps.

As explained in the AC-3 document, AC-3 data may be encoded in two ways: as a 256-sample transform and as a 512-sample transform. The algorithm for matrixing and windowing AC-3 data treats these two transforms slightly differently as shown in FIG. 10. As shown, the process begins at 270 and then a decision step 272 determines whether the data is to be decoded according to a 256-sample transform. Assuming that the answer to this question is no (i.e., a 512-sample transform is to be employed), the system proceeds to a step 274 where 256 samples are loaded for decoding. If, on the other hand, decision step 272 determines that a 256-sample transform is to be employed, the system proceeds to step 284 where only 128 samples are loaded for processing. Thereafter, three inverse fast fourier transform steps are performed before the system loops back to step 284 where a second 128 samples are loaded and processed. This should be contrasted to the 512-sample transform situation, in which only one pass through the inverse fast fourier transform steps is performed. It should be noted that in either case, 256 values are processed prior to transitioning to a windowing and de-interleaving step 282.

In the case of the 256-sample transform, 256 samples are initially provided to the decoder. On the first pass, 128 even values from these 256 input values are processed by the inverse fast fourier transforms steps. In the second pass, the 128 odd values are similarly processed. In case of the 512-sample transform, all 256 sample values are processed in a single pass.

Focusing now on the 512-sample transform, a step 276 performs a pre-IFFT complex multiplication step after the 256 samples have been loaded at step 274. This process is described at page 73 of the AC-3 document in section 7.9.4.1(2). As described, 128 intermediate values designated as "Z[k]" are generated in this step. Each of those values has a real component (Zr) and an imaginary component (Zi). These values are stored in partition 209 of input RAM 201. The expression for these values is given as follows:

$Z[k]=Zr[k]+j*Zi[k]$ $Zr[k]=(X[256-2k-1]*(-\cos(2\theta(8k+1)/4096))-X[2k]*(-\sin(2\theta(8k+1)/4096)))$ $Zi[k]=(X[2k]*(-\cos(2\theta(8k+1)/4096)+X[256-2k-1]*(-\sin(2\theta(8k+1)/4096)))$ In the above expressions, k varies from 0 to 127 and X is the input sample value.

The Z[k] values are calculated as follows. State machine 27 in control logic block 9 provides state information and cycle count information to input RAM interface 17. Based upon this information, input RAM interface 17 extracts the relevant samples (X) from input RAM 201 (partition 207). The input samples values (X) are chosen as required by the above expression for Z[k]. In addition, control logic block 9 provides state information and cycle count information to ROM addressing logic unit 13 which then extracts the appropriate values of the cosine and sine coefficients from ROM 15 (partition 107). The sample values extracted by input RAM interface 17 and the coefficient values extracted by ROM addressing logic unit 13 are provided to data path 19 where they are multiplied as required by the above expression.

As each of the Z[k] are generated, they are written to input RAM 201 at partition 209. Note that each Z[k] value is stored as two components: a real component Zr and an imaginary component Zi.

After the pre-IFFT step is completed (step 276 of FIG. 10), an IFFT step 278 must be performed. After that step has been completed, according to the AC-3 standard, a post-IFFT step 280 must be performed. In a preferred implementation of the present invention, IFFT step 278 is combined with post-IFFT step 280 so that the two steps are performed concurrently.

The advantages of combining these two steps are as follows. First the combination eliminates the need to store any results after the IFFT stage. If the IFFT was conducted separately on all pre-IFFT calculated values, then an additional storage of 256 values would be required. Second, to the extent that the IFFT values must be stored, they need be stored only temporally in two local registers. The two stored IFFT values will be the real and imaginary components calculated for a given index value. Those values are then employed to calculate the real and imaginary components of the post-IFFT result for the same index value.

The IFFT step for the 512-sample transform is described in the AC-3 document in section 7.9.4.1(3). As shown there, 128 values of z[n] are generated. These values are generated according following expression:

$z[n]=\Sigma((Zr[k]+j*Zi[k])*(\cos(\pi kn/64)+j*\sin(\pi kn/64)))$

In this expression each of the 128 values of z[n] are obtained by summing from k=0 to k=127.

As can be seen, each of the 128 values of z[n] contains a real component and an imaginary component. In the preferred implementation, the real component is calculated first, independently of the imaginary component.

Specifically, the real component of each z[n] is generated by accumulating 128 products of Z[k] (retrieved from input partition 209 of RAM 201) and appropriate sine/cosine coefficients (retrieved from partitions 109, 111, and 113 of ROM 15). The Z[k] and coefficient values are multiplied in multiplier 143 of data path 19 and accumulated in accumulator 145 also of data path 19. The resulting real value z[n] is stored in a specified register of intermediate register bank 151 of data path 19. Thereafter, the imaginary component of z[n] is generated in an analogous manner and stored in another specified register of intermediate bank 151.

At this point, the post IFFT step is performed on the values stored in intermediate registers 151. The AC-3 post-IFFT step for the 512-sample transform is described in section 7.9.4.1(4) of the AC-3 document. As shown there, a complex value y[n] is generated for 128 values of n (n varying from 0 to 127). The expression for the post-IFFT step is a follows:

$y[n]=yr[n]+j*yi[n]$ $yr[n]=zr[n]*(-\cos(\pi(8k+1)/2048))-zi[n]*(-\sin(\pi(8k+1)/2048))$ $yi[n]=zi[n]*(-\cos(\pi(8k+1)/2048))-zi[n]*(-\sin(\pi(8k+1)/2048))$ In the preferred implementation of this invention, each time the real and imaginary components of each of value of z[n] are generated as described above, and stored in intermediate registers 151, they are multiplied with the appropriate sine/cosine coefficients from ROM 15 (by multiplier 143) in the post-IFFT step. The resulting real and imaginary components of y[n] are then written back to input RAM 201 (partition 211). Writing the values of y[n] to the appropriate addressing with a input RAM 201 is controlled by input RAM interface 17.

An advantage of combining the IFFT and post-IFFT steps is that the values of z[n] need not be written to RAM 201 and later retrieved. Rather they are stored by only briefly and in readily accessible registers 151 so that they may be quickly retrieved for generating the corresponding values of y[n] in the post-IFFT step.

After the post-IFFT step 280 has been performed (i.e., all 128 values of z[n] have been calculated and written to partition 211), the AC-3 standard requires that two additional steps be performed before the process is completed. Specifically, a windowing/deinterleaving step 282 followed by an overlap and add step 283 must be performed before the process is completed at 294. These steps are described in sections 7.9.4.1.(5) and (6), respectively, of the AC-3 document. In a preferred implementation of the present invention, these distinct steps are combined in to a single step to improve efficiency of the audio core.

As specified in AC-3 document, the windowing and deinterleaving step generates eight values of "x" for each value of n, with n varying from 0 to 63. The expressions for x are as follows:

$$x[2n]=-yi\,[64+n]*w[2n]$$

$$x[2n+1]=yr[64-n-1]*w[2n+1]$$

$$x[64+2n]=-yr[n]*w[64+2n]$$

$$x[64+2n+1]=yi[64-n-1]*w[64+2\,n+1]$$

$$x[128+2n]=-yr[32+n]*w[128-2n-1]$$

$$x[128+2n+1]=yi[32-n-1]*w[128-2n-2]$$

$$x[192+2n]=yi[n]*w[64-2n-1]$$

$$x[192+2n+1]=-yr[64-n-1]*w[64-2n-2]$$

In the above expressions, yr[n] is the real component of y[n], yi[n] is the imaginary component of y[n], and w[n] is a windowing coefficient (stored in partition 105 of ROM 15) and specified in Table 7–33 at 77 of the AC-3 document.

While the AC-3 standard indicates 512 values of x (eight values of x generated for each of 64 values of n) be generated in the windowing and de-interleaving step before proceeding to the overlap and add step, a preferred implementation of the present invention combines all these steps.

According to the AC-3 Document (section 7.9.4.1 (6)), the overlap and add step generates pulse code modulation (PCM) and delay values for 256 values of n according to the following expression:

$$PCM[n]=2(x[n]+\text{delay}[n])$$

$$\text{delay}[n]=x[256+n]$$

The delay value is provided from the previous calculation 256 PCM values (i.e., the PCM values calculated from the previous set of 256 samples loaded into partition 207 or input RAM 201). Thus, the delay value calculated from the above expression is stored for use only when the audio core processes the next 256 input samples.

It has been found that the above expression for PCM values is in error, and the appropriate expression for the PCM values is actually the following:

$$pcm[2n]=2*((-yi[n]*w[2n])+(\text{delay}[n]*w[N/2-2n-1]))$$

$$pcm[2n+1]=2*((-yr[N/8-n-1]*w[2n+1])+(\text{delay}[n+1]*w[N/2-2n-2]))$$

$$pcm[N/4+2n]=2*((=yr1[n]*w[N/4+2n]+(\text{delay}[N/4+n]*w[N/4-2n-1]))$$

$$pcm[N/4+2n=1]=2*((yi1[N/8-n-1]*\,w[N/4+2n+1])+(\text{delay}\,[N/4+n+1]*w[N/4+n+1]))$$

As shown, 256 PCM values are generated from the 512 × values produced in the windowing and deinterleaving step. The PCM values are written to output RAM 7 (through output RAM interface 16) to conclude the audio core's handling of the AC-3 data. As indicated above, the delay values are loaded into partition 213 of input RAM 201. As shown in the above expression, these delay values are simply the remaining 256 values of x[n] that were not used to generate the 256 PCM values output in the previous step. Thus, when the decoding process begins, there will be no delay values (i.e., each delay [n] will be equal to 0). Only after the first 256 input samples have been used to generate 256 PCM output samples, will delay [n] values be available for calculation of the next generation of PCM values.

Note that when the delay[n] values are generated, they are written to input RAM 201 at partition 213 with the aid of input RAM interface 17. Note also that partition 213 must be sufficiently large to store the full complement of delay[n] values for each channel being processed. This is because the delay[n] values must be stored through the whole cycle of IFFT, windowing, and overlap before they can be used. Only at that time are they overwritten with the new values of delay[n].

It should be understood that while the expressions for overlap and add in the AC-3 standard suggest that 256 unique PCM values and 256 unique delay values are generated in the overlap and add step, the audio core implementation of this invention may actually generate 256 unique PCM values but store only 128 delay values, in this step. This is achieved by storing only 128 values of yr2[n] and yi2[n], i.e., store yr2[0], yr2[1], . . . , yr2[63], yi2[0], yi2[1], . . . , yi2[63], as delay values, in partition 213 of input RAM 201. It should be understood, of course, that each of these stored delay values is used twice in calculating subsequent PCM values.

Implementation of the 256-sample transform is similar to implementation of the 512-sample transform. The main difference is that the original 256 samples loaded into the input RAM are divided into "even" samples and "odd" samples for separate processing. As indicated in section 7.9.4.2(1) of the AC-3 standard, the even samples are designated "X1", and the odd samples are designed "X2". These values are loaded in step 284 of the FIG. 10 process.

While the AC-3 document may suggest that the even and odd samples be processed in separate iterations (as indicated at step 292 of 10), the preferred implementation of the present invention performs each IFFT step for both the even and odd values before proceeding to the next IFFT step.

The pre-IFFT step (step 286 of FIG. 10) of the 256-sample transform is described at section 7.9.4.2(2) of the AC-3 standard. As indicated therein, the calculation of Z1[k] (for even values) and Z2[k] (for odd values) employs the same the expression as used to generate Z[k] in the 512-sample transform with the exception of that 64 values of Z1 [k] and 64 values Z2[k] are generated, as opposed to 128 values of Z[k]. The resulting values of Z1[k] and Z2[k] are written back to input RAM 201 as described above in case of the Z[k] values.

IFFT step (step 288 of FIG. 10) and post-IFFT step (step 290 of FIG. 10)—described at section 7.9.4.2(3) and (4) of the AC-3 documents—parallel the corresponding steps for the 512-sample transform. The subsequent windowing and overlap steps are also performed as in the case of the 512-sample transform (see section 7.9.4.2(5) and (6) of the AC-3 document).

Note that the sine and cosine coefficients employed for the pre-and post-IFFT steps is slightly different for the 512-sample and 256-sample transforms. However, the ROM stores only one set of these coefficients as the second set can be easily calculated from the first.

N. Cycle-by-Cycle Implementation of AC-3

Figure 11:
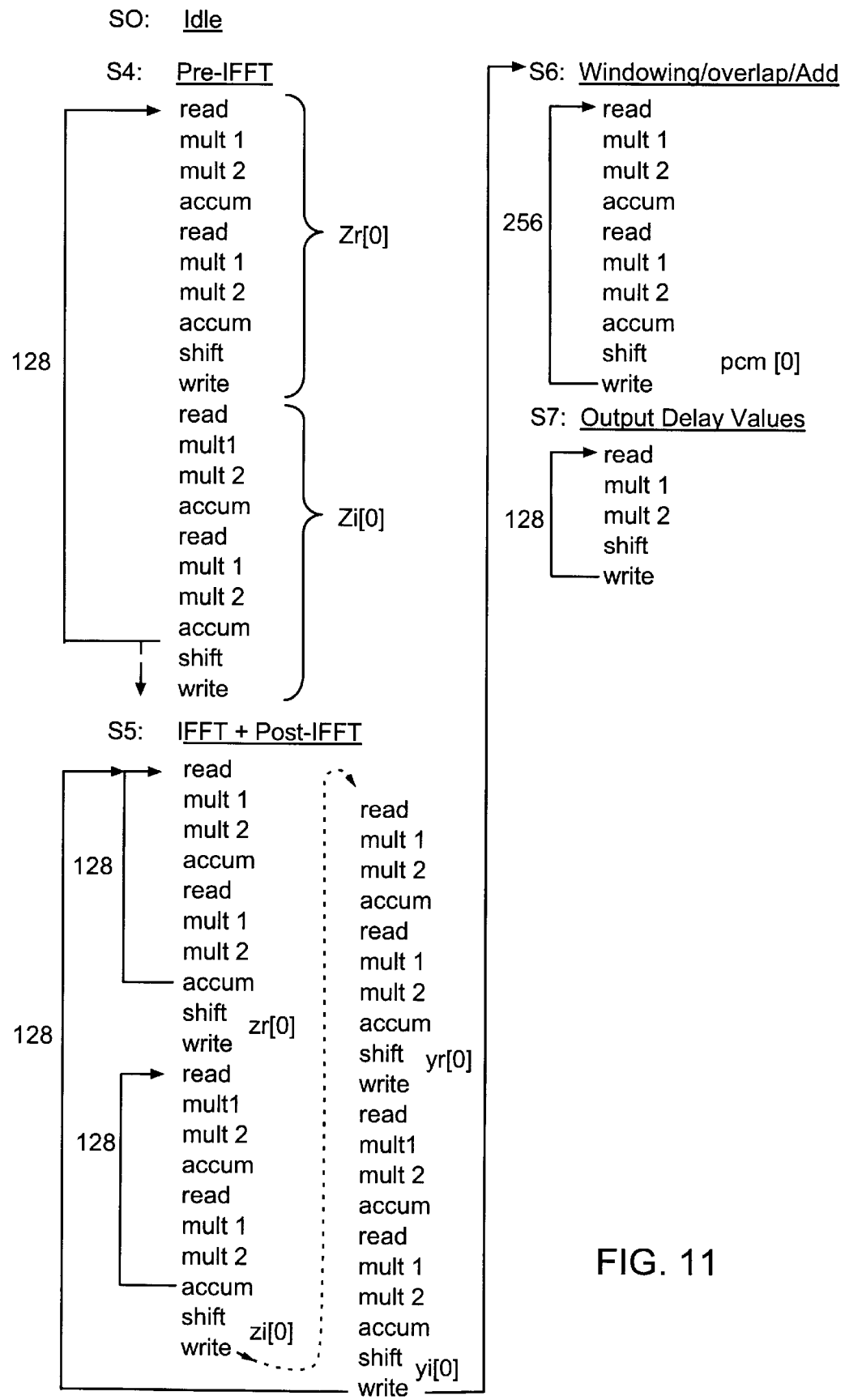
FIG. 11 is a diagram detailing the cycle-by-cycle behavior of the audio core in the various AC-3 states in accordance with a preferred embodiment of the present invention.

FIG. 11 shows the cycle-by-cycle decoding of AC-3 data in accordance with a preferred implementation of the audio core. The procedure is presented for a 512-sample transform. The 256-sample transform is treated similarly except that the IFFT expressions are slightly different as explained above.

As shown, the audio core is initially in state S0, the idle state described above in the context of MPEG decoding. After the full complement of 256 samples is loaded to the input RAM 201, the audio core transitions to state S4 (states S1, S2, and S3 are reserved for MPEG decoding) where the pre-IFFT step is performed. As shown, state S4 begins with a read cycle in which a sample is read from input RAM 201 (partition 207) and a coefficient value is read from ROM 15 (partition 107). These values are then multiplied in multiplier 143 over the next two successive cycles to provide a partial result of Zr[0]. The result is provided to accumulator 145. Thereafter, another read cycle reads in another sample from input RAM 201 and another coefficient from ROM 15. These are then multiplied and their result summed with the value currently held in accumulator 145. The result is Zr[0]. At the next cycle, shifter 147 truncates the least significant 24 bits from the value output by accumulator 145. The shifted value is then written to input RAM 201 (partition 209) as indicated by the write cycle.

The next ten cycles are employed to generate and write Zi[0] to input RAM 201 (partition 209). Note that the first twenty cycles generate Zr[0] and Zi[0] in accordance with the pre-IFFT expression provided above (and in section 7.9.4.1 (2)).

The operations of these first twenty cycles are repeated 128 times to generate and write all 128 values of Zr[k] and Zi[k]. Of course, each new sequence of operations reads different samples from input RAM 201 and different coefficients from ROM 15. Further, each such sequence writes the values of Zr[k] and Zi[k] to different locations within partition 209 of input RAM 201.

After all 128 values of Zr[k] and Zi[k] have been written to input RAM 201, the audio core transitions to state S5, where the IFFT and post-IFFT steps are performed.

As explained above, each z[n] value generated during the IFFT step requires summation of 128 values generated according to the expression presented in section 7.9.4.1 (3) of the AC-3 document (i.e., the expression for z[n] presented above). This is illustrated in FIG. 11 at the S5 state.

Initially, during a read cycle, the audio core reads in the appropriate value of Zr[k] from partition 209 of RAM 201. Simultaneously, the audio core reads in the appropriate IFFT coefficient from either partition 109, 111, or 113 of ROM 15. Thereafter, during two multiply cycles, the Zr[k] and IFFT coefficient values are multiplied. During the next cycle, the resulting product (a first component of the zr[k] expression) is stored in the data path accumulator. The next four cycles (read, mult, mult, accum) are used to generate the second component of zr[k] expression and sum that the first and second components. This takes the audio core through the eighth cycle of state S5.

To generate zr[0], the above eight cycles must be repeated 128 times, with the accumulated value steadily growing, as indicated in FIG. 11. After the 128th iteration has been completed, the audio core shifts the accumulator result to truncate the least significant 24 bits and then writes the value to a first location in the intermediate registers of the audio core data path.

Next, zi[0] is generated by a process identical to that employed to generate zr[0]—while using appropriate values of Zi[k] and ROM coefficients as specified by the expression for z[n]. The resulting value of zi[0] is written to another location in the intermediate registers.

At this point, the post-IFFT processing is performed in accordance with the expressions for yr[0] and yi[0] in section 7.9.4.1 (4) of the AC-3 document.

Note that this stage of the processing is performed while the audio core remains in the state S5. The post-IFFT process for yr[0] begins with a read cycle in which zr[0] is read from the intermediate registers and the appropriate coefficient is read from partition 107 of ROM 15. Then these two values are multiplied in the next two successive cycles. The result, which represents the first component of the expression for yr[0], is provided to the accumulator. In the next four cycles, the second component of that expression is generated and accumulated with the first component. The result is yr[0] which is shifted and then written to partition 211 of input RAM 201 in two successive cycles as shown in FIG. 11.

The value of yi[0] is generated and written to partition 211 in a similar manner. As shown, the process of generating and storing yr[0] and yi[0] from zr[0] and zi[0] requires twenty cycles in this embodiment.

The IFFT and post-IFFT processing steps described above are repeated for each value of z[n] and y[n], from n=0 to n=127 as shown in FIG. 11. At the end of this process, partition 211 or input RAM 201 is populated with 128 values of yr[n] and 128 values of yi[n].

At this point, the audio core transitions to state S6, as shown, where the windowing step (including deinterleaving, overlap, and add) is performed. As explained above, a combined version of the expressions presented in AC-3 document sections 7.4.9.1 (5) and (6) for PCM[n] is employed in this step. This expression has two terms: the first is the product of the yr[n] or yi[n] with a windowing coefficient w, and the second is the product of a constant and a delay value.

During the first cycle in state S6, the audio core reads (1) the appropriate value of yr[n] or yi[n] from partition 211 of input RAM 201 and (2) the appropriate windowing coefficient from partition 105 of ROM 15. During the next two cycles, these two values are multiplied. During the fourth cycle, the product is provided to the accumulator.

Next, during the fifth cycle, the appropriate delay value is read from partition 213 of input RAM 201. During the next three cycles, that delay value is multiplied by a constant and accumulated with the first term of the expression for PCM [0]. The resulting sum is shifted in the next cycle and written to output RAM 7 in the next cycle after that. All the while, the audio core remains in state S6.

The above sequence of ten cycles to generate and write PCM[0] is repeated 256 times to generate and write PCM[1] through PCM[255]. After all 256 PCM values for a given channel are written to output RAM 7, the audio core transitions to state S7 where 128 delay values are written to partition 213 of input RAM 201.

Each such delay value is the product of a yr[n] (or yi[n]) value and a windowing coefficient w. Thus, each of the 128 unique delay values is obtained via a read cycle, two multiply cycles, and a shift cycle. The resulting value is written to the input RAM during a subsequent write cycle.

O. Overall Process Flow for the Audio Core

Figure 12:
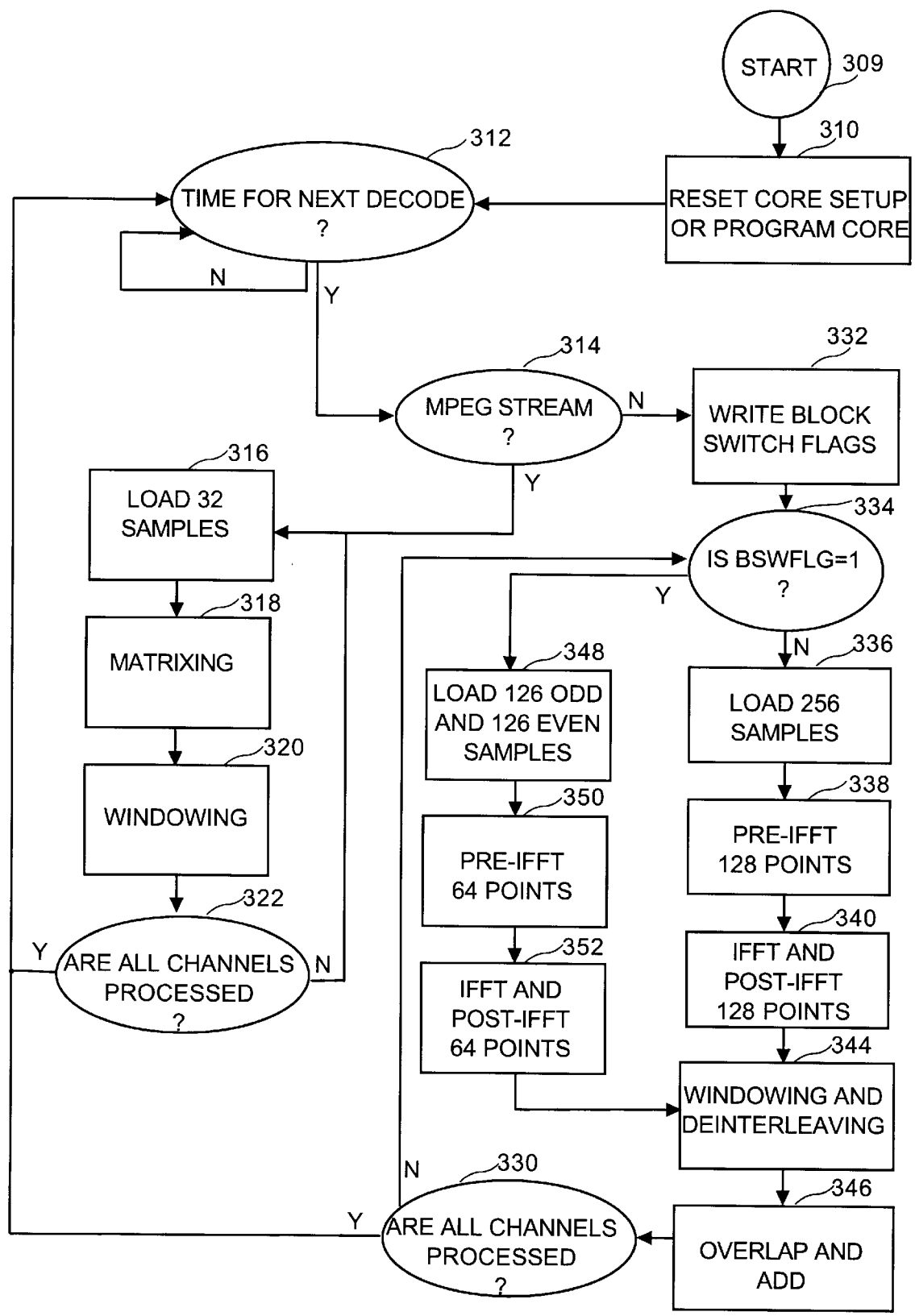
FIG. 12 is a process flow diagram showing the primary steps undertaken by the audio core to perform MPEG and AC-3 decoding.

The process steps employed by the audio core to decode MPEG or AC-3 data are presented as process flow 308 in FIG. 12. Process 308 begins at 309 and proceeds to a step 310 where the audio core is reset, setup or programmed. This step specifies such information as the number of channels being decoded, whether the data is encoded accordance with the AC-3 or MPEG standard, etc. Such information is provided to the audio core registers from the bitstream. Next, at a step 312, the audio core determines whether it is time to begin the next decoding cycle. The new decoding cycle begins every time 32 samples per channel have been processed for MPEG data or 256-samples per channel have been decoded for AC-3 decoding. If it is not yet time for the next decode cycle, the process does not proceed beyond process step 312.

Assuming that it is now time for the next decode cycle, a process 314 determines whether the input bit stream is an MPEG stream. If so, 32 samples per channel (3*32 samples for MPEG-2, Layer II) are loaded from outside the core to input RAM 201 at a step 316. Thereafter, those samples are matrixed at a step 318. As described above, the matrixing performed within the audio core of this invention actually subsumes three MPEG process steps: shifting, matrixing, and building vector V. Next, a windowing step 320 is performed to compute and output 32 PCM samples. As explained above, this windowing step actually combines the windowing and PCM calculation steps required by the MPEG standard.

At this point, a process step 322 determines whether all channels of encoded MPEG data have yet been decoded. If not, process control returns to step 316 where 32 samples for the next channel are loaded for use by the audio core. MPEG decoding proceeds as before to generate 32 new PCM samples for the current channel. After all channels have been decoded, and decision step 322 is therefore answered in the affirmative, process control returns to decision step 312 where the audio core determines whether the it is time for the next decoding cycle.

If decision step 314 determines that the incoming bit stream is actually an AC-3 stream (as opposed to an MPEG stream), the process moves to a process step 332 where the block switch flags are written to the audio core. Thereafter, a decision step 334 determines whether the block switch flag for the current channel is set equal to 1. If not, the incoming AC-3 data is encoded according to the 512-sample transform. The process control thus turns to a step 336 where 256 samples are loaded for processing. Thereafter, the pre-IFFT step is performed at a step 338.

Next, the IFFT and post-IFFT steps are performed in single step 340 as described above. The resulting values are written back to input RAM 201. From this point the process proceeds to step 344 where the windowing and deinterleaving steps are performed as described above. From there, the overlap and add steps are performed at step 346. This concludes the data manipulation by the audio core for the AC-3 data.

The audio core now determines whether all channels of AC-3 data have been decoded for the current decoding cycle at a decision step 330. If not, process control returns to decision step 334 which checks the block switch flag setting for the new channel. Assuming that it is still set equal to 0, the audio core processes the samples as described above with respect to steps 336, 338, 340, 344, and 346.

If, however, the block switch flag is set equal to 1, a process step 348 loads 128 odd samples and 128 even samples (from the 256 total samples) for processing in accordance with the 256-sample transform. After all of the odd and even samples have been loaded at 348, the audio core performs the pre-IFFT processing on both the odd and even samples at a step 350. Next, a process step 252 performs the IFFT and post-IFFT decoding steps of the intermediate values generated from step 350. From there, windowing and deinterleaving are performed at step 344 as described above, and the process proceeds from there as described above.

P. Conclusion

Although the foregoing invention has been described in some detail for purposes of clarity of understanding, it will be apparent that certain changes and modifications may be practiced within the scope of the appended claims. For example, while the video decoder core of this invention preferably implements specific functions in accordance the MPEG, MPEG-2, and AC-3 standards, there is in principal no reason why the audio cores of this invention can not be employed with other audio decoding algorithms which do not necessarily adhere to the MPEG, MPEG-2, or AC-3 protocols. Therefore, the present embodiments are to be considered as illustrative and not restrictive, and the invention is not to be limited to the details given herein, but may be modified within the scope of the appended claims.

What is claimed is:

1. An audio core circuit design for decoding encoded audio data, the audio core comprising:

a hardware layout having a data path for performing some functions of both MPEG audio decoding and AC-3 audio decoding, said audio core being used on a first integrated circuit having a first integrated circuit design that is specific to the MPEG audio decoding, and a second integrated circuit having a second integrated circuit design that is specific to the AC-3 audio decoding, the audio core circuit design is configured to perform a matrixing function and a windowing function that is used by both MPEG audio decoding and AC-3 audio decoding; and wherein the first and second integrated circuit designs have at least some features not in common.

2. The audio core circuit design of claim 1 further comprising a control logic unit, an input RAM interface for controlling an input RAM, an output RAM interface for controlling an output RAM, a ROM, a ROM addressing logic unit, and a registers interface.

3. The audio core circuit design of claim 1 wherein the data path includes at least one multiplier and at least one accumulator.

4. The audio core circuit design of claim 1 further comprising a ROM which stores constants used in the MPEG-2 and AC-3 audio decoding algorithms.

5. The audio core circuit design of claim 4 further comprising a ROM interface for controlling reading data from the ROM.

6. The audio core circuit design of claim 4 wherein the ROM stores constants including at least (i) matrixing constants for AC-3 and MPEG audio decoding algorithms and (ii) windowing coefficients for AC-3 and MPEG audio decoding algorithms.

7. The audio core circuit design of claim 1 further comprising an input RAM interface for controlling writing data to and reading data from an input RAM located outside the audio core.

8. The audio core circuit design of claim 7 wherein the input RAM interface controls reading of samples from an input data partition of the input RAM and controls writing intermediate values generated during matrixing to one or more intermediate partitions of the input RAM.

9. The audio core circuit design of claim 8 wherein the input data partition and the one or more intermediate partitions of the input RAM are provided in different locations for MPEG and AC-3 decoding algorithms.

10. The audio core circuit design of claim 1 further comprising an output RAM interface for controlling writing data to an output RAM located outside the audio core.

11. The audio core circuit design of claim 1 further comprising a control logic unit which specifies in which state of multiple states the audio core currently resides, each of the multiple states specifying one function or group of functions of either the MPEG or AC-3 decoding process.

12. The audio core circuit design of claim 11 wherein the control logic unit includes an MPEG state machine for generating MPEG state and cycle count information and an AC-3 state machine for generating AC-3 state and cycle count information.

13. An audio core circuit design for decoding encoded audio data, the audio core comprising hardware means including:
   a means for performing some functions of both MPEG audio decoding and AC-3 audio decoding, said audio core being used on a first integrated circuit means having a first integrated circuit design that is specific to the MPEG audio decoding, and a second integrated circuit means having a second integrated circuit design that is specific to the AC-3 audio decoding;
   an input RAM interface means for controlling writing data to and reading data from an input RAM means located outside the audio core; and
   an output RAM interface means that outputs data that has been at least partially decoded.

14. The audio core circuit design of claim 13 further comprising a means for storing constants which stores constants used in the MPEG-2 and AC-3 audio decoding algorithms.

15. The audio core circuit design of claim 13 wherein the decoding functions include matrixing and windowing of MPEG and AC-3 audio decoding algorithms.

16. The audio core circuit design of claim 13 wherein the means for performing some functions of both MPEG audio decoding and AC-3 audio decoding includes at least one means for multiplying and at least one means for accumulating.

17. An audio core circuit design for decoding encoded audio data that is received from an input RAM, the audio core being defined in a hardware layout comprising:
   a ROM for storing constants that include at least matrixing constants for AC-3 and MPEG audio decoding algorithms, and at least windowing constants for AC-3 and MPEG audio decoding algorithms, the constants used in some functions of both MPEG audio decoding and AC-3 audio decoding;

wherein the encoded audio data is at least partially decoded in the audio core circuit design, and then output to an output RAM.

18. The audio core circuit design of claim 17, wherein the ROM includes a first partition for storing a first set of constants which are used as both inverse discrete cosine transform (IDCT) coefficients for MPEG decoding and inverse fast fourier transform (IFFT) coefficients for AC-3 decoding.

19. The audio core circuit design of claim 18, wherein the first set of constants contains 34 unique constants.

20. The audio core circuit design of claim 17, wherein the ROM includes a second partition for storing a second set of constants which are used for pre-IFFT and post-IFFT steps of AC-3 decoding.

21. The audio core circuit design of claim 20, wherein the second set of constants includes 256 unique constants.

22. The audio core circuit design of claim 17, wherein the ROM includes 256 windowing coefficients for AC-3 decoding, 256 windowing coefficients for MPEG decoding, 256 coefficients for pre-IFFT and post-IFFT steps of AC-3 decoding, and 34 coefficients for both IFFT in AC-3 decoding and IDCT in MPEG decoding.

23. The audio core circuit design of claim 17 further comprising a ROM interface for controlling reading data from the ROM.

24. An audio core circuit design for decoding encoded audio data, the audio core comprising:
   an input RAM interface for controlling writing data to and reading data from an input RAM that is not contained within the audio core, such that the input RAM stores values used in some functions of both MPEG audio decoding and AC-3 audio decoding; and
   an output RAM interface for controlling writing data to an output RAM that is not contained within the audio core.

25. The audio core circuit design of claim 24 wherein the input RAM interface controls reading of samples from an input data partition of the input RAM and controls writing intermediate values generated during a matrixing operation to one or more intermediate partitions of the input RAM.

26. The audio core circuit design of claim 25 wherein the input RAM interface also controls reading intermediate values from the input RAM.

27. The audio core circuit design of claim 25 wherein the input data partition and the one or more intermediate partitions of the input RAM are provided in different locations for MPEG and AC-3 decoding algorithms.

28. An audio integrated circuit core including circuit components for processing audio decoding functions that are common in MPEG audio decoding and AC-3 audio decoding, the audio integrated circuit core comprising:
   an input RAM interface circuit for controlling writing data to and reading data from an input RAM that is external to the audio integrated circuit core; and
   a ROM for storing a plurality of matrixing constants for use in matrixing in the AC-3 audio decoding and the MPEG audio decoding, and a plurality of windowing constants for use in windowing in the AC-3 audio decoding and MPEG audio decoding.

29. An audio integrated circuit core as recited in claim 28, wherein the ROM has a first partition for storing a first set of constants that are used as both inverse discrete cosine transform coefficients for MPEG audio decoding, and inverse fast fourier transform coefficients for the AC-3 audio decoding.

30. An audio integrated circuit core as recited in claim 28, wherein a bit allocation decoding, a scale factor decoding, a variable length decoding, a requantization operation, a decoupling operation, a rematrixing operation, and a dynamic range compression operation of the AC-3 audio decoding and the MPEG audio decoding are performed by circuitry that is external to the audio integrated circuit core.

31. An audio integrated circuit core as recited in claim 29, further comprising:
 a data path within the audio integrated circuit core, such that the matrixing and the windowing are performed along the data path, the data path including at least one multiplier and at least one accumulator.

\* \* \* \* \*